US007283808B2

(12) United States Patent
Castell et al.

(10) Patent No.: US 7,283,808 B2
(45) Date of Patent: Oct. 16, 2007

(54) SYSTEM, METHOD AND MOBILE DEVICE FOR REMOTE CONTROL OF A VOICE MAIL SYSTEM

(75) Inventors: William D. Castell, Waterloo (CA); Gary P. Mousseau, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 306 days.

(21) Appl. No.: 10/051,697

(22) Filed: Jan. 18, 2002

(65) Prior Publication Data

US 2002/0098831 A1    Jul. 25, 2002

Related U.S. Application Data

(60) Provisional application No. 60/262,575, filed on Jan. 18, 2001.

(51) Int. Cl.
*H04M 11/10* (2006.01)
(52) U.S. Cl. .................. 455/413; 379/88.23; 370/401; 713/159
(58) Field of Classification Search ............. 379/88.12, 379/67.1, 88.11, 93.08, 88.19, 88.17, 88.22, 379/88.23, 158; 455/413, 466, 412.1, 406, 455/412.2, 414.4; 370/401; 713/159
See application file for complete search history.

(56) References Cited

U.S. PATENT DOCUMENTS 4,106,060 A    8/1978    Chapman, Jr.

(Continued)

FOREIGN PATENT DOCUMENTS

AU    7843498    5/1997

(Continued)

OTHER PUBLICATIONS

Motorola, "AirMobile™ Wireless Comm Guide for cc:Mail" User Guide Version 1.0, Motorola Wireless Data Group, 1995, pp. 3-48.

(Continued)

*Primary Examiner*—Gerald Gauthier
(74) *Attorney, Agent, or Firm*—Jones Day; Krishna K. Pathiyal; Robert C. Liang

(57) ABSTRACT

A unified messaging system, method and user interface is provided for a handheld mobile communication device. The method may include the following steps: (a) providing a unified event listing display comprising: a plurality of summary descriptors, each summary descriptor having one or more information elements to identify the event associated with the summary descriptor; (b) selecting one of the plurality of summary descriptors; (c) displaying a voice mail interface associated with the selected summary descriptor, wherein a plurality of voice mail actions are displayed on the interface; (d) selecting one of the plurality of voice mail actions; (e) communicating a voice mail command associated with the selected voice mail action to a unified messaging server via a wireless data communication network; (f) receiving the voice mail command at the unified messaging server; (g) executing an action associated with the received voice mail command at the unified messaging server; (h) establishing a circuit-switched communication connection to the mobile device from a PBX system associated with the unified messaging server; and (i) performing an action corresponding to the received voice mail command through the established circuit-switched communication connection.

42 Claims, 10 Drawing Sheets

U.S. PATENT DOCUMENTS

| | | |
|---|---|---|
| 4,695,880 A | 9/1987 | Johnson et al. |
| 4,697,281 A | 9/1987 | O'Sullivan |
| 4,713,780 A | 12/1987 | Schultz et al. |
| 4,837,798 A | 6/1989 | Cohen et al. |
| 4,837,800 A | 6/1989 | Freeburg et al. |
| 4,856,047 A | 8/1989 | Saunders |
| 4,928,096 A | 5/1990 | Leonardo et al. |
| 4,951,044 A | 8/1990 | Nelson et al. |
| 4,980,907 A | 12/1990 | Raith et al. |
| 5,008,926 A | 4/1991 | Misholi |
| 5,043,721 A | 8/1991 | May |
| 5,086,502 A | 2/1992 | Malcolm |
| 5,125,021 A | 6/1992 | Lebowitz |
| 5,127,041 A | 6/1992 | O'Sullivan |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,250 A | 3/1994 | Okumura et al. |
| 5,299,255 A | 3/1994 | Iwaki et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,418,463 A | 5/1995 | Fleming et al. |
| 5,436,960 A | 7/1995 | Campana, Jr. et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,481,611 A * | 1/1996 | Owens et al. ............... 713/159 |
| 5,487,100 A | 1/1996 | Kane |
| 5,493,692 A | 2/1996 | Theimer et al. |
| 5,495,484 A | 2/1996 | Self et al. |
| 5,548,789 A | 8/1996 | Nakanura |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,788 A | 2/1997 | Tett |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,706,211 A | 1/1998 | Beletic et al. |
| 5,727,202 A | 3/1998 | Kucala |
| 5,729,735 A | 3/1998 | Meyering |
| 5,737,531 A | 4/1998 | Ehley |
| 5,742,905 A | 4/1998 | Pepe et al. |
| 5,745,689 A | 4/1998 | Yeager et al. |
| 5,751,960 A | 5/1998 | Matsunaga |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bezaire et al. |
| 5,758,150 A | 5/1998 | Bell et al. |
| 5,761,416 A | 6/1998 | Mandal et al. |
| 5,764,639 A | 6/1998 | Staples et al. |
| 5,764,899 A | 6/1998 | Eggleston et al. |
| 5,765,170 A | 6/1998 | Morikawa |
| 5,771,353 A | 6/1998 | Eggleston et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,812,671 A | 9/1998 | Ross, Jr. |
| 5,812,773 A | 9/1998 | Norin |
| 5,812,819 A | 9/1998 | Rodwin et al. |
| 5,813,016 A | 9/1998 | Sumimoto |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,867,660 A | 2/1999 | Schmidt et al. |
| 5,878,434 A | 3/1999 | Draper et al. |
| 5,881,235 A | 3/1999 | Mills |
| 5,889,845 A | 3/1999 | Staples et al. |
| 5,903,723 A | 5/1999 | Beck et al. |
| 5,905,777 A | 5/1999 | Foladare et al. |
| 5,928,329 A | 7/1999 | Clark et al. |
| 5,937,161 A | 8/1999 | Mulligan et al. |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,958,006 A | 9/1999 | Eggleston et al. |
| 5,961,590 A | 10/1999 | Mendez et al. |
| 5,964,833 A | 10/1999 | Kikinis |
| 5,966,663 A | 10/1999 | Gleason |
| 5,968,131 A | 10/1999 | Mendez et al. |
| 5,973,612 A | 10/1999 | Deo et al. |
| 5,974,180 A | 10/1999 | Schwendeman |
| 5,974,238 A | 10/1999 | Chase, Jr. |
| 5,978,837 A | 11/1999 | Foladare et al. |
| 5,983,073 A | 11/1999 | Ditzik |
| 5,987,508 A | 11/1999 | Agraharam et al. |
| 5,995,597 A | 11/1999 | Woltz et al. |
| 6,000,000 A | 12/1999 | Hawkins et al. |
| 6,006,274 A | 12/1999 | Hawkins et al. |
| 6,009,173 A | 12/1999 | Sumner |
| 6,014,429 A | 1/2000 | LaPorta et al. |
| 6,018,762 A | 1/2000 | Brunson et al. |
| 6,023,700 A | 2/2000 | Owens et al. |
| 6,023,708 A | 2/2000 | Mendez et al. |
| 6,034,621 A | 3/2000 | Kaufman |
| 6,035,104 A | 3/2000 | Zahariev |
| 6,052,442 A | 4/2000 | Cooper et al. |
| 6,052,563 A | 4/2000 | Macko |
| 6,052,735 A | 4/2000 | Ulrich et al. |
| 6,058,431 A | 5/2000 | Srisuresh et al. |
| 6,067,561 A | 5/2000 | Dillon |
| 6,072,862 A | 6/2000 | Srinivasan |
| 6,073,137 A | 6/2000 | Brown et al. |
| 6,073,165 A | 6/2000 | Narasimhan et al. |
| 6,084,969 A | 7/2000 | Wright et al. |
| 6,085,192 A | 7/2000 | Mendez et al. |
| 6,085,231 A | 7/2000 | Agraharam et al. |
| 6,085,232 A | 7/2000 | Kikinis |
| 6,091,951 A | 7/2000 | Sturniolo et al. |
| 6,092,114 A | 7/2000 | Shaffer et al. |
| 6,092,191 A | 7/2000 | Shimbo et al. |

| | | |
|---|---|---|
| 6,101,531 A | 8/2000 | Eggleston et al. |
| 6,112,244 A | 8/2000 | Moore et al. |
| 6,115,394 A | 9/2000 | Balachandran et al. |
| 6,115,736 A | 9/2000 | Devarakonda et al. |
| 6,125,281 A | 9/2000 | Wells et al. |
| 6,125,369 A | 9/2000 | Wu et al. |
| 6,128,739 A | 10/2000 | Fleming, III |
| 6,130,892 A | 10/2000 | Short et al. |
| 6,131,096 A | 10/2000 | Ng et al. |
| 6,131,116 A | 10/2000 | Riggins et al. |
| 6,134,432 A | 10/2000 | Holmes et al. |
| 6,138,146 A | 10/2000 | Moon et al. |
| 6,141,690 A | 10/2000 | Weiman |
| 6,144,671 A | 11/2000 | Perinpanathan et al. |
| 6,144,997 A | 11/2000 | Lamming et al. |
| 6,151,606 A | 11/2000 | Mendez |
| 6,154,839 A | 11/2000 | Arrow et al. |
| 6,157,630 A | 12/2000 | Adler et al. |
| 6,157,950 A | 12/2000 | Krishman |
| 6,163,274 A | 12/2000 | Lindgren |
| 6,167,379 A | 12/2000 | Dean et al. |
| 6,170,057 B1 | 1/2001 | Inoue et al. |
| 6,185,603 B1 | 2/2001 | Henderson et al. |
| 6,215,859 B1 * | 4/2001 | Hanson .................. 379/88.12 |
| 6,219,694 B1 | 4/2001 | Lazaridis et al. |
| 6,233,341 B1 | 5/2001 | Riggins |
| 6,240,088 B1 | 5/2001 | Gayton et al. |
| 6,249,820 B1 | 6/2001 | Dobbins et al. |
| 6,256,666 B1 | 7/2001 | Singhal |
| 6,272,545 B1 | 8/2001 | Flanagin et al. |
| 6,275,848 B1 | 8/2001 | Arnold |
| 6,275,850 B1 | 8/2001 | Beyda et al. |
| 6,292,668 B1 | 9/2001 | Alanara et al. |
| 6,314,519 B1 | 11/2001 | Davis et al. |
| 6,324,544 B1 | 11/2001 | Alam et al. |
| 6,324,587 B1 | 11/2001 | Trenbeath et al. |
| 6,330,244 B1 * | 12/2001 | Swartz et al. ............... 370/401 |
| 6,333,973 B1 * | 12/2001 | Smith et al. ............. 379/88.12 |
| 6,356,956 B1 | 3/2002 | Deo et al. |
| 6,389,115 B1 * | 5/2002 | Swistock ................. 379/88.12 |
| 6,389,276 B1 * | 5/2002 | Brilla et al. ................ 455/413 |
| 6,400,958 B1 | 6/2002 | Isomursu et al. |
| 6,408,177 B1 * | 6/2002 | Parikh et al. ............ 455/414.4 |
| 6,434,378 B1 * | 8/2002 | Fougnies .................... 455/406 |
| 6,449,287 B1 | 9/2002 | Leuca et al. |
| 6,470,358 B1 | 10/2002 | Beyda et al. |
| 6,487,560 B1 | 11/2002 | LaRue et al. |
| 6,580,784 B2 * | 6/2003 | Rodriguez et al. ....... 379/88.12 |
| 6,636,733 B1 * | 10/2003 | Helferich ................ 455/412.2 |
| 6,792,086 B1 * | 9/2004 | Saylor et al. ............ 379/88.17 |
| 2001/0015977 A1 | 8/2001 | Johansson |
| 2002/0059380 A1 | 5/2002 | Biliris et al. |

FOREIGN PATENT DOCUMENTS

| | | |
|---|---|---|
| DE | 19961345 | 12/1999 |
| EP | 0617373 | 9/1994 |
| EP | 0736989 | 10/1996 |
| EP | 0772327 | 5/1997 |
| EP | 0788287 | 8/1997 |
| EP | 09214556 | 8/1997 |
| EP | 0777394 | 9/1997 |
| EP | 0793387 | 9/1997 |
| EP | 0825788 | 2/1998 |
| EP | 0838774 | 4/1998 |
| EP | 0838934 | 4/1998 |
| EP | 0772327 | 2/1999 |
| EP | 0918417 | 5/1999 |
| EP | 0930766 | 7/1999 |
| EP | 0986225 | 3/2000 |
| JP | 1289346 | 10/1999 |
| US | 0001552 | 5/2001 |
| US | 0029531 | 10/2001 |
| US | 0040693 | 11/2001 |
| US | 0042093 | 11/2001 |
| US | 0054072 | 12/2001 |
| WO | 9619064 | 6/1996 |
| WO | 9726709 | 7/1997 |
| WO | 9727717 | 7/1997 |
| WO | 9732251 | 9/1997 |
| WO | 9733421 | 9/1997 |
| WO | 9741654 | 11/1997 |
| WO | 9744942 | 11/1997 |
| WO | 9800787 | 1/1998 |
| WO | 9821911 | 5/1998 |
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |
| WO | 9963709 | 12/1999 |
| WO | 0011567 | 3/2000 |
| WO | 0011832 | 3/2000 |
| WO | 0020994 | 4/2000 |
| WO | 0113572 | 2/2001 |
| WO | 0113656 | 2/2001 |
| WO | 0141472 | 6/2001 |
| WO | 0167716 | 9/2001 |
| WO | 0171539 | 9/2001 |

OTHER PUBLICATIONS

Motorola, "Air*Mobile*™ Wireless Comm Server for cc:Mail" Guide Version 1.1, Motorola Wireless Data Group, 1995, pp. 4-46.

Sun Microsystems, JavaMail API Design Specification, Version 1.0, Dec. 9, 1997, Sun Microsystems, Inc., chapters 1-10 appendices A-E.

Compaq, Aero 2100 Series Color Palm-size PC Reference Guide, Second Edition, Aug. 1999, Compaq Corporation.

Gadol, Steve, et al. "Nomadic Tenets- A User's Perspective," Sun Microsystems Laboratories, Inc., pp. 1-16 (Jun. 1994).

Declaration of David A. Keeney regarding SAM System, pp. 1-33 (Sep. 3, 2002).

SAMpage Manual, version 2.0, TeckNow! (Feb. 1990).

Reiter, Alan A., "Focus on Technology," Telocator (Jan. 1990) (4 pages).

Kuehn, Carl, "More than EMail," Southwest Computer & Business Equipment Review, vol. VII, No. 2, (Feb. 1990) (1 pg.).

SAM System for Automated Messages User's Manual (1988) (17 pgs.).

Motorola Operating Instructions for Your "PMR 2000" Series Display Radio Pagers Personal Message Center (2000) (7 pgs).

Motorola PMR 2000 Personal Message Receiver POCSAG (CCIR Radio Paging Code #1) (1986) (6 pgs.).

Feibus, "A Desktop In Your Palm", Informationweek, Aug. 25, 1997, pp. 65ff.

Behr, "Handheld Solutions", Informationweek, Oct. 27, 1997, pp. 106-113.

Newsletter, E-Mail Merges With Voice Through Infinite Technologies, Voice Technology & Services News, May 26, 1998.

Newsletter, VODAPAGE: Vodapage demos increasing convergence of pagers and mobile communications at TMA 29, M2 Presswire, Nov. 28, 1996.

Mosher, Microsoft Exchange User's Handbook, Duke Press, 1997, pp. 547-549.

"3 Com PalmPilot Gets Wireless Link for E-Mail", Spooner, John G., PC Week, Dec. 8, 1997.

"Have Your Pager Call My Pager", Sullivan, Kristina B., PC Week, Dec. 8, 1997.

Briere, Daniel, et al., "One Mailbox, Just Like Old Times," Network World, vol. 14, issue 16, p. 21 (Apr. 21, 1997).

Padwick, et al., Special Edition Using Microsoft Outlook 97, 1997, Que Corporation, pp. 250-251, 353-367.

News Release, "Motorola Rings in 1995 with the Launch of the Marco® Wireless Communicator," Jan. 4, 1995 (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs.).

Dewey, Barney, "Communications Strategies for Newton 2.0," Newton Technology Journal, p. 10, Jun. 1996.

Press Release, "Motorola Announces New Solutions to Provide Consumers with Wireless Access to Personal and Enterprise E-mail Accounts," Mar. 21, 2001 (4 pgs.).

"Motorola's 'Marco' Wireless Communicator," http://www.msu.edu/-luckie/gallery/marco.htm, Jun. 14, 2001 (3 pgs.).

News Release, "CE Software Announces Mobile Vision," Editorial Contacts, CE Software, Inc., 1995 (3 pgs.).

News Release, "CE Software Ships MobileVision," Jun. 20, 1995 (3 pgs.).

Newton Reference, Communications, 1996-1997(4 pgs.).

PC Pro Issue 31: Realworld Computing, PDA Column, Jul. 30, 1997 (7 pgs.).

Enterprise Solutions for Email Overload, Founder Publications, http://www.amikanow.com/corporte/publications.htm, Aug. 6, 2001 ,(9 pgs.).

"Motorola's 'Marco' Wireless Communicator," http://www.msu.edu/-luckie/gallery/marco.htm, Aug. 6, 2001 (2 pgs.).

Press Release, "Apple Agrees to License Newton Technology to Schlumberger, Digital Ocean," Nov. 3, 1995 (3 pgs.).

Frezza, Bill, "PDA, PDA, Wherefore Art Thou, PDA?", Freewire, Aug. 6, 2001 (6 pgs.).

Black, Lauren, et al., "Personal Digital Assistants," Macworld Reviews, Aug. 6, 2001 (5 pgs.).

Reference, "MobileVision Direct Wireless Connection to Your LAN-Based Electronic Mailbox," CE Software, Inc., pp. 1, 3, 5, 7, 9, 11, 13, 15, 17, 19, 21, 1995.

User Manual, "MobileVision Direct Wireless Connection to Your LAN-Based Electronic Mailbox," CE Software, Inc. 1995.

Johnson, David B., "Ubiquitous Mobile Host Internetworking," Fourth Workshop on Workstation Operating Systems, pp. 85-90, Oct. 14-15, 1993.

Johnson, David B., "Mobile Host Internetworking Using IP Loose Source Routing," School of Computer Science, Carnegie Mellon University, pp. 1-14 Feb. 1993.

Schoettle, Bob, "IP-Address Management on LANs" Byte, pp. 199-200, Feb. 1996.

Cheshire, Stuart, et al., "Internet Mobility 4 ×4," Computer Science Department, Stanford University, pp. 1-12, Aug. 1996.

Yeorn, Hoen Y., et al., "IP Multiplexing by Transparent Port-Address Translator," Proceedings of the Tenth USENIX System Administration Conference, pp. 113-122, Sep. 29- Oct. 4, 1996.

Johnson, David B., "Scalable and Robust Internetwork Routing for Mobile Hosts," IEEE Computer Society, pp. 2-11, 1994.

Egevan, K. et al., "The IP Network Address Translator," Network Working Group, pp. 1-10, May 1994.

Book, "Internetwork Mobility The CDPD Approach," by Mark S. Taylor, William Waung, and Mohsen Banan, Jun. 11, 1996.

"BlackBerry Technical White Paper," Research In Motion Ltd., Version 1.0, 1998-1999.

Newsletter, "Battery Friendly Bulletin," Vol. 1, Issue 3, pp. 1-7 and unnumbered page, 1999.

Article, Comerford, "Handhelds Duke It Out for the Internet," Wireless Internet, pp. 35-38 and 41, Aug. 2000.

Press Detail, "Extended Systems and Motorola Bring Short-Range Wireless to the Paging E-volution," Jan. 13, 2000 (3 pgs.).

Press Detail, "3Com Corporation Licenses Bluetooth Technology from Extended Systems," Feb. 22, 2000 (2 pgs.).

Web site Article, Hawaleshka, "The Web in Your Pocket," Maclean's, May 15, 2000 (3 pgs.).

Claxton, "Messaging API's for Voice Networks," Telecommunications, pp. 116-120, 1998.

Gifford, David K., et al., "The Application of Digital Broadcast Communication to Large Scale Information Systems." IEEE Journal on Selected Areas in Communications, vol. SAC-3, No. 3, pp. 457-467 (May 1985).

Gifford, David K., et al., "An Architecture for Large Scale Information Systems," ACM, pp. 161-170 (1985).

* cited by examiner

Opening an Item in the
Event Listing Screen

Voice Mail Message -
Choice Screen

Voice Mail
DTMF Interface

SYSTEM, METHOD AND MOBILE DEVICE FOR REMOTE CONTROL OF A VOICE MAIL SYSTEM

CROSS REFERENCE TO RELATED APPLICATION

This application claims priority from U.S. Provisional Application Ser. No. 60/262,575 filed on Jan. 18, 2001, which is hereby incorporated into the present application by reference.

BACKGROUND

1. Field of the Invention

The present invention is directed toward remote control of a host system with a dual-mode mobile communications device (mobile device). Specifically a method is disclosed for seamlessly integrating PBX services, including voice mail services, into a mobile device for control by the user.

2. Description of the Related Art

There are very few systems that allow remote control of host systems from mobile devices. There are no known solutions that use a dual-mode mobile device to remotely control PBX and voice mail systems. In the area of related art the closest solution known to the author uses a browser-like method for controlling file viewing, file printing and file re-routing like to a fax machine. Some of these solutions can also act like a terminal emulator and thus allow the user to login to the company network and act like any other terminal user. These types of solutions are very far from what is described in this patent. In the field of phone technology there are also methods to call a service provider and turn call forwarding on or off, and change the call forwarding number. In this area an individual home phone, office phone, or cell phone can adjust some of the operating parameters but this has no multi-discipline effect on both voice and data information.

It is naturally possible to use two devices to perform some of the actions described in this patent, but these solutions have lots of problems and are prone to errors. For example one device is inevitably turned off, or has out of battery, or is out of reach in a suitcase or a travel bag. The elegance of having full control over the PBX and voice system is the ideal solution. There is also the problem of costs for all these devices to solve problems of data and voice notifications. By adding costs and requiring multiple devices to solve simple problems the number of users will to purchase such a solution goes down very quickly. Finally, there is a complete lack of elegance when two devices are required to deal with both voice and data to proper control over the host system. The mobile user expects simplicity and ease of use when deal with notifications, and acting upon notifications.

Therefore, there remains an important area of remote control of a host system, from a dual-mode mobile communication device, that has not been satisfied.

SUMMARY

A unified messaging system, method and user interface is provided for a handheld mobile communication device. The method may include the following steps: (a) providing a unified event listing display comprising: a plurality of summary descriptors, each summary descriptor having one or more information elements to identify the event associated with the summary descriptor; (b) selecting one of the plurality of summary descriptors; (c) displaying a voice mail interface associated with the selected summary descriptor, wherein a plurality of voice mail actions are displayed on the interface; (d) selecting one of the plurality of voice mail actions; (e) communicating a voice mail command associated with the selected voice mail action to a unified messaging server via a wireless data communication network; (f) receiving the voice mail command at the unified messaging server; (g) executing an action associated with the received voice mail command at the unified messaging server; (h) establishing a circuit-switched communication connection to the mobile device from a PBX system associated with the unified messaging server; and (i) performing an action corresponding to the received voice mail command through the established circuit-switched communication connection.

DETAILED DESCRIPTION

A. Overview of the System

Figure 1:
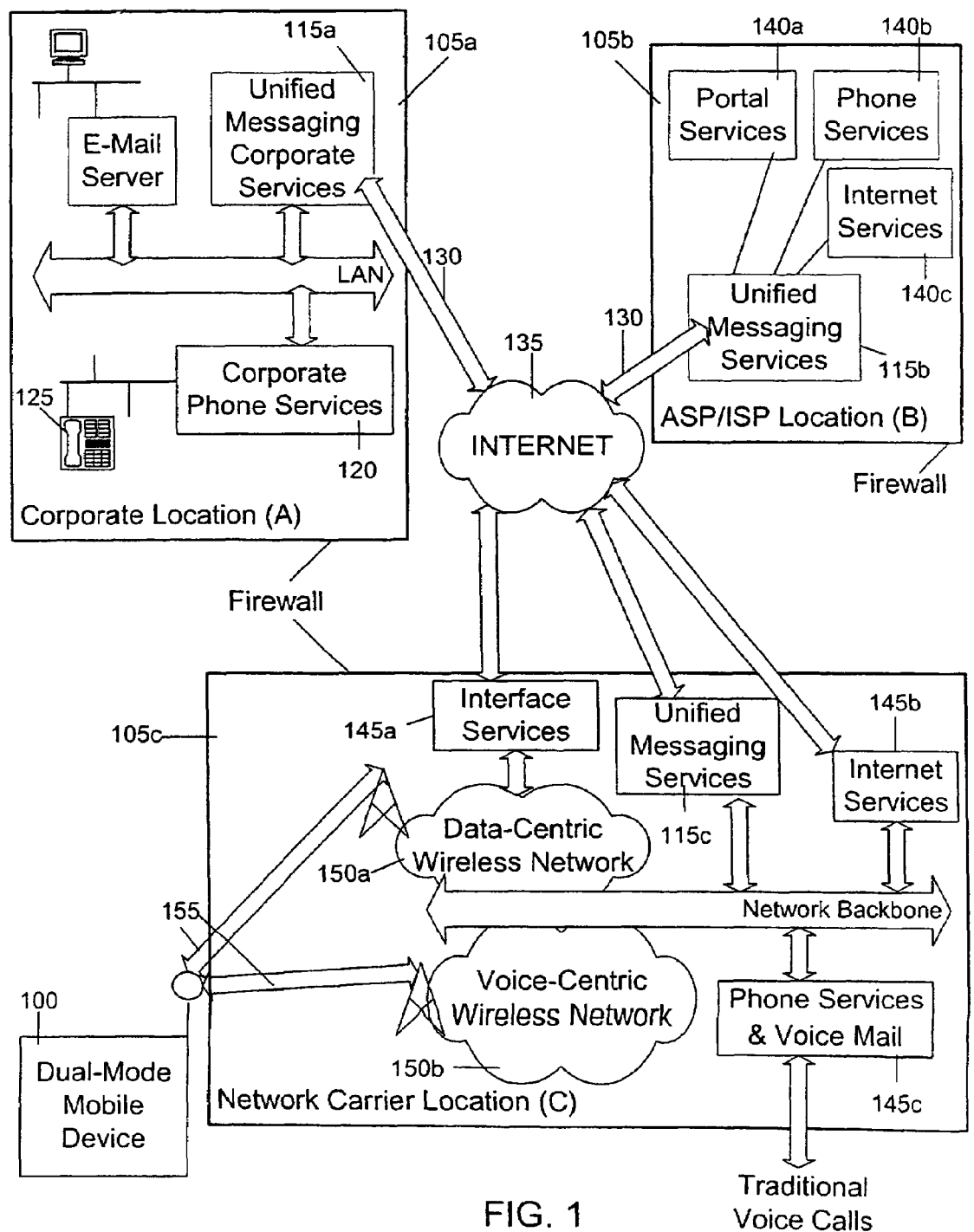
FIG. 1 is an overview of where the invention is used in three different environments where PBX and voice-mail systems can reside.
Figure 2:
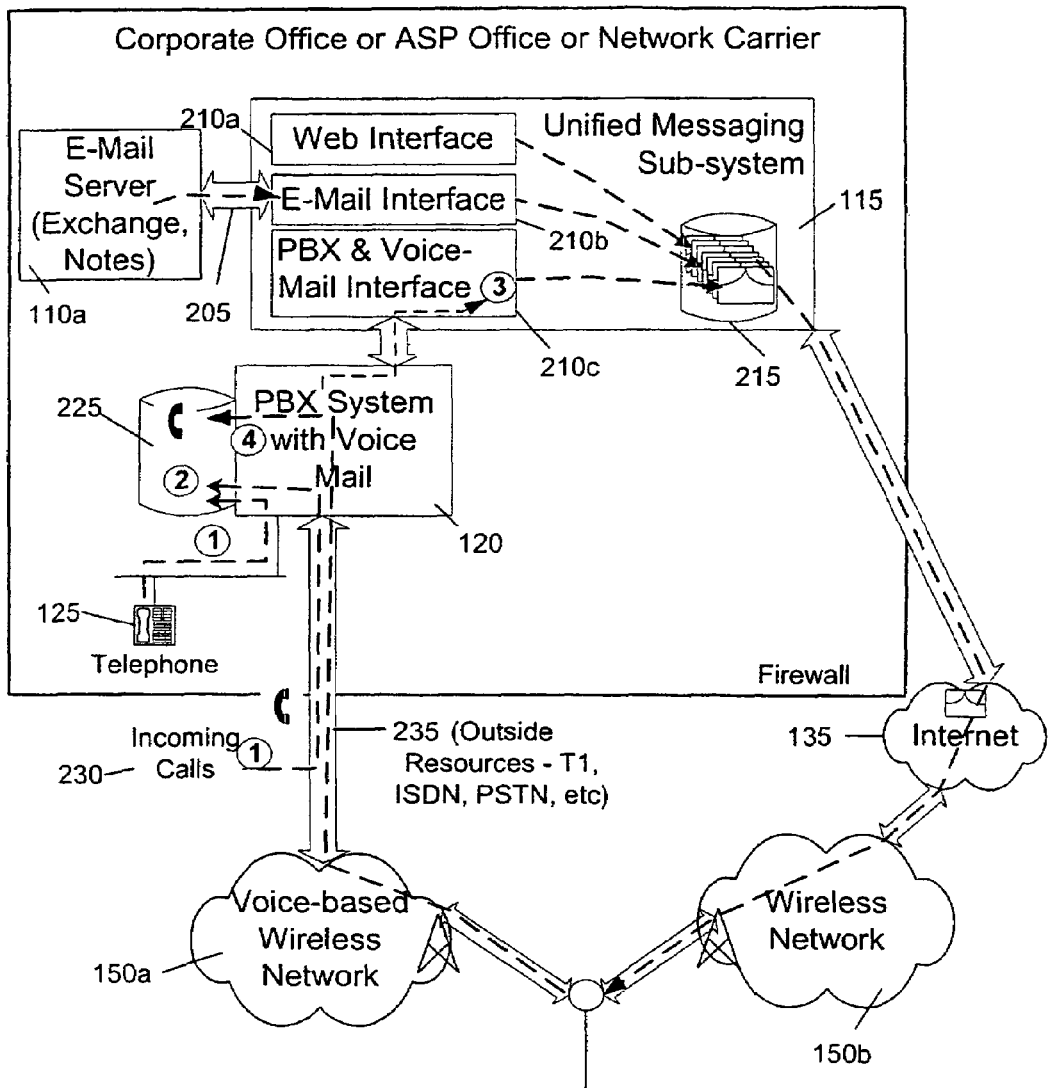
FIG. 2 shows one embodiment of the invention as used by a mobile device user to retrieve voice mail.
Figure 2:
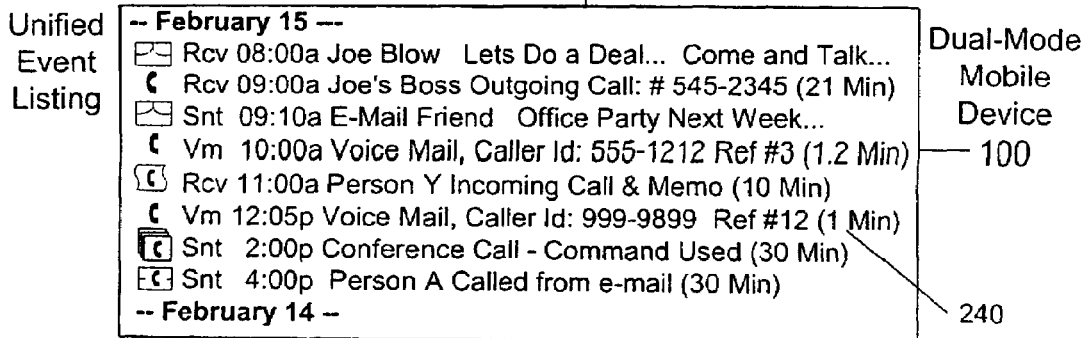

With reference to FIG. 1 this diagram provides an overview to the environment where the invention is used. The first component in the illustration is a dual-mode mobile device 100 ("mobile device"). This mobile device 100 is shown as having Radio Frequency ("RF") connections to both a data-Centric wireless network 150a and a voiceCentric wireless network 150b. The voice-centric network 150b preferably provides circuit switched communication connections. Although these networks are shown as separate, one skilled in the art will appreciate that it is now possible for a single network like GSM/GPRS to support both cell phone and data traffic through the same network infrastructure. Another component in FIG. 1 is the unified messaging service 115, which can reside in many places. Unified messaging is well known in the field of land-line data communications, but it applicability to wireless mobile devices has not proceeded due to a lack of integration of functionality in the mobile device. In this context the unified messaging service can be used either in the corporate environment (A), the Application Service Provider (ASP) or Internet Service Provider (ISP) environment (B), or within the wireless network carrier location (C). Functionally the unified messaging service attempts to unify different sources of information and events for a given user. One goal of this unifying is to provide a single source for information, events, messages and voice traffic so that organization is simplified. As shown in FIG. 2, this unification may include a complete database and storage area 215 that contains messages and events that have been sent to the mobile device 100. Other major features include: one addressing method to reach users, less time for information retrieval by the user of the mobile device 100 and an accurate chronological ordering to events and information on the mobile device 100.

B. Remote Control Over Voice-mail System

Turning now to FIG. 1 there is presented three different information centers 105a, 105b, 105c all capable of communicating to a dual-mode mobile device ("mobile device") 100. Each information center has a set of services that could be used with a unified messaging service 115a, 115b, 115c to provide a range of information to the mobile device 100. The unified message service 115 also co-ordinates the activities and notifications to the mobile device 100, through its links to the wireless network 150. The voice-centric wireless network, or more traditionally the cellular network, also provides the ability to reach each information center 105. For example a mobile device 100 can call into a voice-mail center, through a Private Automatic Branch exchange ("PBX") to retrieve voice mail messages. This kind of activity is common for cell phone users today. For this mobile device 100, the cell-phone support is just one part of the functionality which resides within the mobile device 100 beside the data capabilities. These communication methods are not mutually exclusive and both could be operating simultaneously or cooperatively together on the same mobile device 100.

The components that make up a unified messaging solution can vary, depending on the sophistication of the unified messaging service and the goal of the service provider. Generally all services are protected by a firewall environment, this is especially important as most services are accessible through the Internet 135. Unified messaging services 115 can include but is not limited to e-mail support, web site access and phone/voice-mail services. By leveraging the data component of the unified messaging service 115, the phone services component can provide notification and other types of features. Where necessary the unified messaging service 115 uses the Internet to exchange information with the worldwide web, and with mobile devices 100. Within most corporate locations (A) the availability of phone services is standard. The corporation often has PBX access to allow the corporate phone system access to a certain capacity of phone circuits from the phone company. Many companies also purchase additional services with their PBX system. Such additional service include Interactive Voice Response (IVR) systems to provide call routing, call services and voice-mail. When calls arrive into the corporate user, the system is programmed to ring the desktop phone of the user for a certain number of rings before sending the call to voice-mail. As shown in detail in FIG. 2, the voice-mail component after receiving the voice-mail is then able to inform the user via a data command sent through the unified messaging service. In one embodiment, the notification may be provided by adding a new voice-mail data element in the inbox of the user's unified inbox such as the inbox for users of Microsoft Exchange. In an alternative embodiment, this notification can take place through wireless e-mail, short messaging service (SMS), enhanced messaging service (EMS), multi-media messaging service (MMS) or the Internet Messaging Service (IMS). The invention can also be used with an application service provider (ASP) or an Internet service provider (ISP) 105b. An example of an ASP service would include a private network like America On Line's ("AOL™") network, MSN.com, or some other 802.11 network standard-like LAN capable of exchanging information at extremely high rates. Within an ASP or ISP 105b environment (B) there are a range of services 140 for customers of the ISP/ASP. As ISP's try to differentiate themselves they are finding it necessary to offer advanced portal, messaging and phone services. In this environment (B), similar to the corporate environment (A), there can be a unified messaging service available for mobile devices 100. The unified messaging service unifies all messaging and data services so that the mobile device 100 is able to present these events to the mobile device 100 user in a consistent and harmonious fashion.

Both the corporate location (A) and the ISP/ASP (B) have links to the Internet 135 for exchanging information with mobile devices 100, and for general Internet 135 access for information and content. This physical connection 130 would use a range of existing data communication technologies including but not limited to Ethernet, Cable Modem, DSL, ISDN, Frame Relay over any number of physical cables like T1 or fiber. These connections will not be discussed with other diagrams, as they are very well known by those skilled in the art.

The term wireless network 150 has been used in two contexts (1) the data-centric wireless network 150a and (2) the voice-centric wireless network 150b. For one skilled in the art, it has been stated that these two networks can be merged into one single network that can support both voice and data communications over the same physical network. The newest of these combined networks include, but are not limited to (1) the Code Division Multiple Access (CDMA) network, (2) the Groupe Special Mobile or the Global System for Mobile Communications (GSM) and the General Packet Radio Service (GPRS) both developed by the standards committee of CEPT, and (3) the future third-generation (3G) networks like EDGE and UMTS. GPRS is a data overlay on-top of the very popular GSM wireless network. Some older examples of data-centric network include, but are not limited to: (1) the Mobitex Radio Network ("Mobitex"), which has been developed by Eritel and Ericsson of Sweden, and is operated by Cingular in the United States, and (2) the DataTAC Radio Network ("DataTAC"), which has been developed by Motorola and is operated by American Mobile Satellite Corporation (AMSC) now called Motient, in the United States.

The network carrier location (C) 105c preferably includes the necessary infrastructure that makes up the wireless network 150, and other supporting computers. For one skilled in the art the components within the wireless network 150 are well known and include base stations, and routing nodes like SGSN and GGSN nodes in a GSM/GPRS network. As network carriers are trying to differentiate their services, and acquire greater revenue from the wireless user, they are installing value-added services 145. These include unified messaging services 115c, Internet services like portals 145b and phone services 145c. A phone service, to support basic calls to cell phones, has been part of cellular networks since their creation. Some of services include, but are not limited to: voice-mail support, call forwarding, call holding, call waiting and advanced 411-call dialing. Network carriers 105*c* are also installing advanced services that support inter-connection between services. This allows for voice-mail systems to inform mobile device 100 users when voice-mail messages have been deposited into their voice-mailbox. This invention then allows these same users to take the next step and act upon that notification seamlessly from their mobile device.

With reference to FIG. 2 this overview diagram illustrates how a unified messaging service can interoperate with the PBX and voice-mail system to give the user a user-friendly remote control over that voice mail system from the user's mobile device. Using the unified messaging system 115 as a focus, this Figure illustrates how a notification message can be sent out, through an interface to the voice-mail system, to a mobile device 100. After reception the mobile device 100 can react to the notification in a way that seamlessly causes the voice-mail system to play the voice-mail message without necessarily downloading over-the-air that voice-mail message onto the mobile device.

Turning now to FIG. 2 there is a much more complex illustration of all the data exchanges and relationships between the various components of the system. FIG. 2 also shows the relationship between the unified message subsystem and other sub-systems like e-mail and PBX systems. The PBX system 120 links to local telephones 125, and supports plain old telephone service (POTS) lines 235. When used within a network carrier environment, the PBX system 120 might also provide SS7 gateway support for cell phone connections. Voice-mail support has a data store 225 for saving voice messages and other IVR configuration data. E-mail connections might use Internet standards like POP3 or IMAP4 to Unix mail systems, or proprietary interfaces like Microsoft's MAPI, or Lotus Notes API for corporate mail servers. Corporate e-mail servers like 'Microsoft Exchange™, or Lotus Notes™ are just two of the hundreds of e-mail systems available in the marketplace today.

In this first embodiment, the first step (1) is the arrival of incoming phone calls for a given user, that is out of the office. These phone calls 230 can be coming from the outside world, over a T1 line or some other truck line, or coming from other phones 125 within the company PBX system 120. The company's PBX system 120 gets no answer at the user's desktop and performs step (2) by sending the call to the voice-mail system 225. This voice-mail system may be a direct part of the existing PBX, or an added solution, i.e. a separate physical computer system. The PBX and voice-mail system 120 will place the call in the user's voice-mail mailbox 225 until it is played, forwarded, deleted or accessed in some other action by the user. Naturally, the voice-mail solution 120 stores a large number of voice mail messages, and each voice message is given an identifier or reference number so the user can proceed through them in an orderly fashion. Interfacing to the voice-mail system is a voice-mail interface 210*c*, which uses an Application Program Interface (API) to interact with the voice-mail system and the PBX system. This is similar to the API used to access mail 210*b*, previously referenced as POP3 or IMAP4. Additionally, a web interface might exist 210*a* for access Internet content and web pages.

At step (3) the voice-mail interface 210*c* detects the arrival of a new voice-mail message saved in the message store 225. If there is a mobile device 100 configured for that voice-mail mailbox, then the unified messaging system 115 sends a notification message of the call to the mobile device 100. Configuration information for the unified messaging system is preferably kept within a database for all mobile device 100 users 215. In one embodiment, this database might have both configuration information and actual messages being delivered to mobile devices 100. These messages serve as references for the user in case they want to perform additional functions, like getting more data of an e-mail message. The notification message is sent to the mobile device 100 through the Internet via the wireless network; except if the unified messaging server 115 resides in the network carrier's infrastructure domain, then it can send directly to the mobile device 100 via the wireless network. The notification message preferably includes one or more of the following pieces of information:

message waiting indicator—this is an indicator or flag in the header of a the notification message. Where a SMS message means is used as the notification message, the message waiting indicator indicates it is a voice mail notification type of SMS message.

Voice-mail message reference identification—this uniquely identifies the message within the user's voice mailbox at the user's voice mailbox.

Voice-mail access telephone number—for calling back into the voice mail system.

Caller ID—calling line identity of the caller who left the voice mail message, if available.

Date and time of call

The summary message preferably contains information like the caller id, message call length, message reference number, time it was received and any other information it can get from the caller information. In an alterative embodiment, the unified messaging component is fully integrated into the PBX and voice-mail system 120. In this embodiment, there is only one piece of software that performs both these functions.

Once the user has received the summary message of the voice mail message on the mobile device 100 they are notified using several methods. The device might begin to vibrate, it might give an audible tone or a combination of both. The user then has the option of responding to the message by opening it and performing the next action. The user might also choose to ignore the message and it will reside in the unified event listing 250 that shows all voice and data events in a single event listing. The unified event listing is preferably a reflection of the events that occurred in the unified messaging server 115 (such as, but not limited to incoming e-mail messages received at the user's account at the user's office, faxes received at a fax number associated with the user, voice mail messages) and within the mobile device 100 by the user (such as, but not limited to outgoing email messages generated at the mobile device, telephone call logs). This list can be sorted by the user to show all chronological events, only outgoing e-mail events, only outgoing phone events, incoming phone events or any other category of event available on the mobile device 100. A summary message or summary descriptor preferably comprises of one or more information elements. In a preferred embodiment, the one or more information elements includes one or more of the following: an graphical icon, a time stamp of when the event was received on or transmitted from the mobile, subject line and sender's name.

Figure 4A:
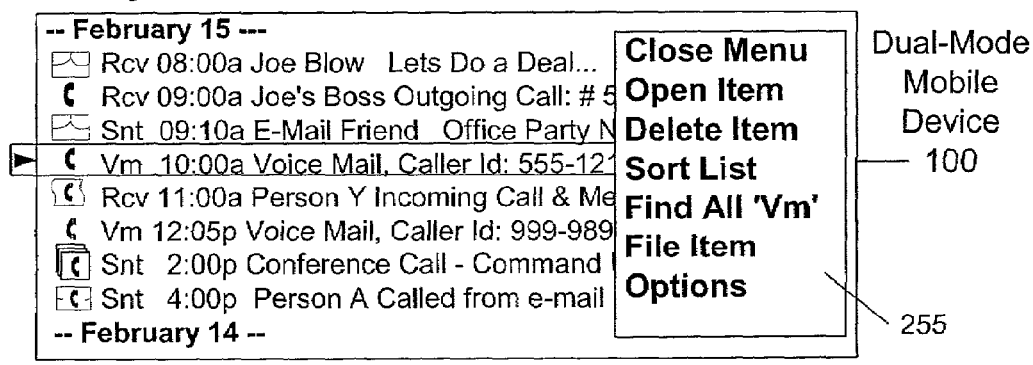
FIGS. 4a, 4b and 4c are examples of three control screens seen by the user of the mobile device when they interact with the unified messaging system.
Figure 4B:
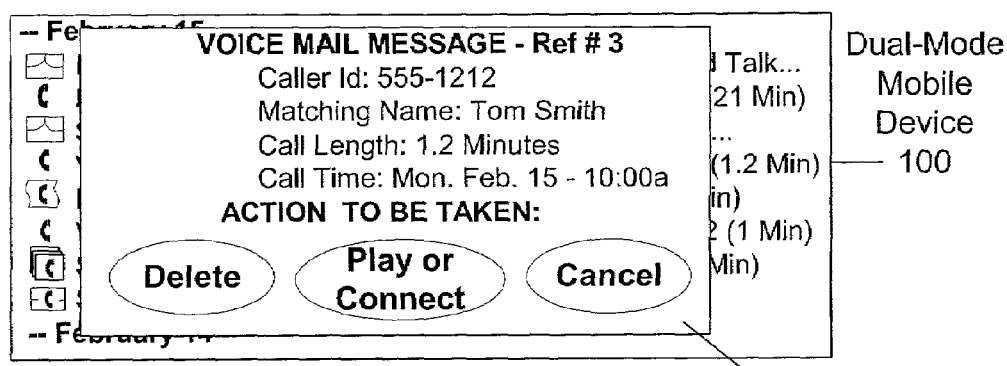

In this embodiment, the next step occurs when the user of the mobile device 100 opens the voice-mail summary message to listen to the message. A summary of one type of visual display used on the mobile device 100 is shown in FIG. 4*a*. In this screen the user has exposed a menu of actions 255 that allows the user to perform an action on an item in the unified event listing. As illustrated, the user has already selected an item in the list, shown by the arrowhead. The methods to perform this action might include, but are not limited to using: a touch-screen interface, a roller wheel, a mouse button, cursor keys or some other navigation method. In this situation, the user further selects the "Open Item" action and reveals all the details of the event, which causes FIG. 4b to appear to the user. In this example the detailed information provided in the voice mail message 260 shows the caller id, a matching address book entry for the caller id, if present, the recorded message length, and the time the call was taken. For one skilled in the art, there could be many other screen presentations and choices. In this example, the user can select Delete, Cancel or Play/Connect. The delete selection could mean to delete the locally stored voice mail summary message, or both the locally stored voice mail summary message and the associated voice mail message stored in association with the voice mail server. The cancel selection could possibly clear this dialog box and return to the unified event listing 255. The play/connect selection might either play the message, or connect to the PBX and voice-message system 120. Once the play/connect action is selected, the screen moves to FIG. 4c. During this display the mobile device 100 is performing actions behind the scenes.

Figure 4C:
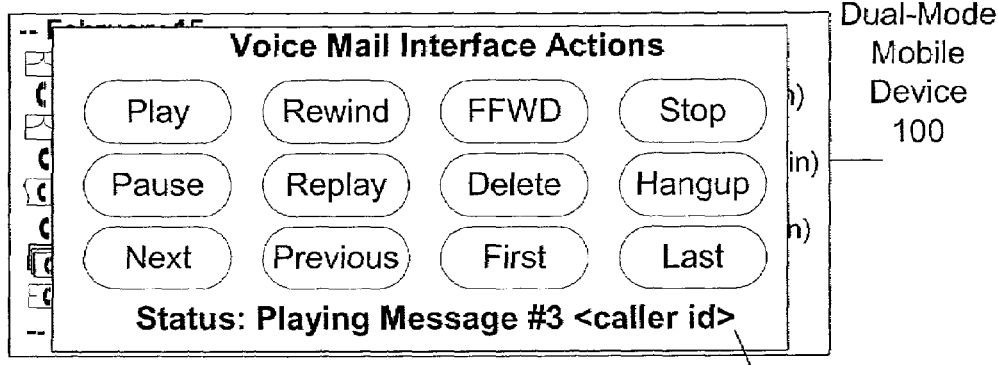

Once the user selects the Play/Connect action, the mobile device 100 takes step 4 shown on FIG. 2. Turning back to FIG. 2 step 4, this embodiment causes a circuit switch, cellular call to be made to the PBX/Voice-mail system 120. The actual phone number of the PBX/voice-mail system (and any password or DTMF access codes associated with accessing the voice-mail system of the mobile device user) could be in the original voice-mail summary message, or could be pre-configured/stored into the mobile device 100. To improve the integration of the solution, the PBX/voice-mail system is either configured to recognize the mobile device's incoming caller Id information, or the mobile device plays a secret DTMF tone sequence to uniquely identify it from the plurality of other mobile devices. To further enhance security both caller ID information and the DTMF-based password may be used to authenticate the mobile device user. It is preferable that both the outgoing call to the PBX/voice-mail system and any exchange of DTMF tones between the mobile device and the voice mail system are accomplished without the need for user input or user intervention (i.e., no need to type in the password). In a preferred embodiment, the mobile device suppresses the DTMF tones associated with initiating and connecting an outgoing call to the PBX system/voice mail system. In the preferred embodiment, the DTMF tones may identify the particular voice mail message to act on. In this manner, the retrieval of voice mail messages is seamless and transparent to the mobile device user. After this step is complete, the voice-mail interface 120 and the mobile device 100 preferably automatically exchange DTMF tones to communicate. The DTMF tones can be pre-configured into the application on the mobile device 100, or the user could configure them depending on what the voice-mail DTMF commands are expected by the PBX system. For example, to play a voice mail message, the voice mail server may expect three 1s from the mobile device. In this case, the mobile device may be pre-configured to output three 1s as DTMF tones to the voice mail server when the user presses play. Turning to FIG. 4c, there is an example list of the types of commands 265 that would be useful for a voice-mail system 120. For one skilled in the art, he or she understands that this is only an example list of commands. Some of the commands might have specific actions, like the hang-up command, would drop the communication link to the voice-mail server 120. In advanced voice-mail systems, 120 the normal hierarchical interactive voice response interface might be collapsed so that shorter, direct DTMF commands take the user directly to final actions.

Figure 3:
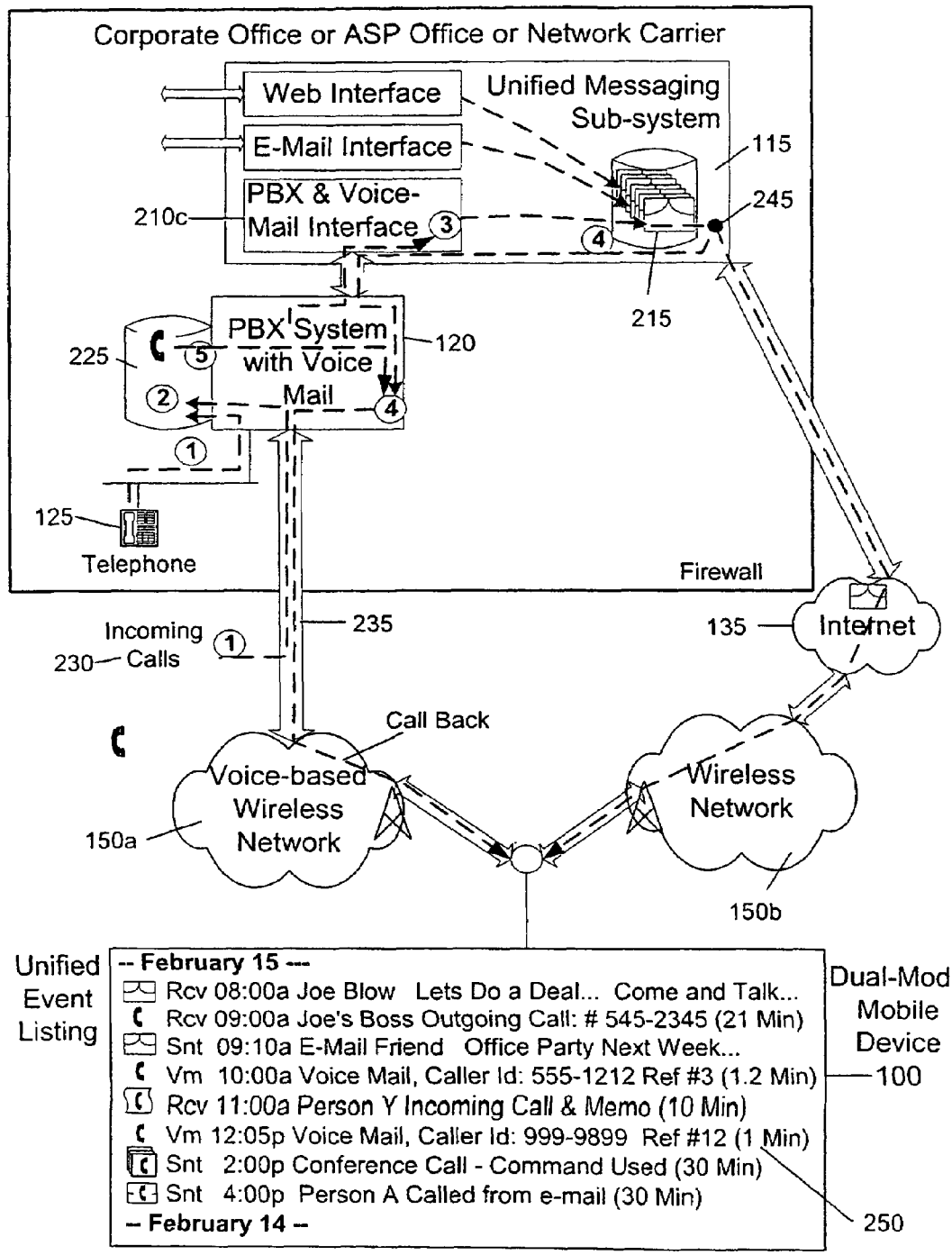
FIG. 3 shows a second embodiment of the invention as used by a mobile device user to retrieve voice mail.

Turning now to FIG. 3, in this second embodiment the first three steps are preferably similar to those described in FIG. 2. In step (1) a call arrives in for the user through the PBX system 120. It comes from a local company user 125, or from the outside world 230. Step 2 occurs because the user is away from their desk, so the message is placed into voice-mail storage 225. In step 3, the voice-mail interface component 210c, preferably within the unified messaging system 115, detects the voice-message has been stored or received and sends a notification message of the voice mail message through the wireless data network 150b to the mobile device 100. The notification message preferably includes one or more of the following information: telephone number of the PBX to make into all into, telephone number of caller, length of voice mail message and an identifier of the voice mail messsage. Upon receipt of the notification message, a summary message is preferably generated at the mobile device based on information from the notification message. As shown in FIG. 4 the user sees the message 250 and has the option of opening the message as in FIG. 2. After opening the message the user selects the Play or Connect option, a data message leaves the mobile device 100. In this embodiment, the data message is a command to the unified messaging sub-system to request the PBX/voice-mail interface to initiate a circuit-switched call to the mobile device 100. The command is preferably sent via the wireless data network 150b from the mobile device and includes the identifier of the voice mail message. The unified messaging system 115 preferably is awaiting for such incoming commands from the mobile device 100. A central command processor 245 is present to watch for a particular command sequence, or some other data component. This command could be exchanged in e-mail, where the subject line, or the body has a special character sequence to indicate that a PBX/voice-mail command is present. The email preferably would include the identifier of the voice mail message. In this manner, email may be the transport mechanism for remotely managing the PBX/voice-mail system.

In step 5 the voice-mail interface 210c uses preferably the PBX/voice-mail API calls to provide an outgoing voice circuit where a call is made preferably to the configured number for that user or the mobile device. The user is able to override this number by configuring another number in the mobile device 100 that will accompany the data command. Otherwise if the override number is absent, the default number will be used. There are several advantages to this method. First, the method provides greater security for both systems. The PBX/voice-mail system knows which mobile device number to call, and an incoming connection cannot be impersonated. This security can be further improved by removing the option within the mobile device 100 to override the default cell phone number. Secondly, in some wireless cellular networks the costs of accepting an incoming cell phone call is less then making an outgoing cell phone call.

When the PBX/voice-mail system 120 calls the mobile device, the mobile device may be configured to recognize the caller Id of the PBX/voice-mail system 120. This ability to recognize the incoming call is from the PBX/voice-mail system preferably allows the incoming call to be automatically accepted by the mobile device without the need for user input or user intervention (i.e., press the "talk" or "pick up" button to accept the incoming). In a preferred embodiment, the mobile device suppresses the ring tones or other notification of incoming calls (i.e., vibration) associated with such incoming call. In one embodiment, the user of the mobile device is not prompted for voice mail system passwords, etc. In this manner, the retrieval of voice mail messages is seamless and transparent to the mobile device user. This seamless integration is possible because of the coordinated design between the two systems (the voice mail system and the mobile device). Similarly in FIG. 4c, each time a DTMF tone is played by the mobile device to the voice-mail system, the user preferably does not hear these DTMF tones as the mobile device's speakers are preferably muted or suppressed. Once the user is done interacting with voice-mail they can perform the hang-up command action that would terminate the incoming voice circuit-switched connection.

C. Mobile Device Description

Figure 5:
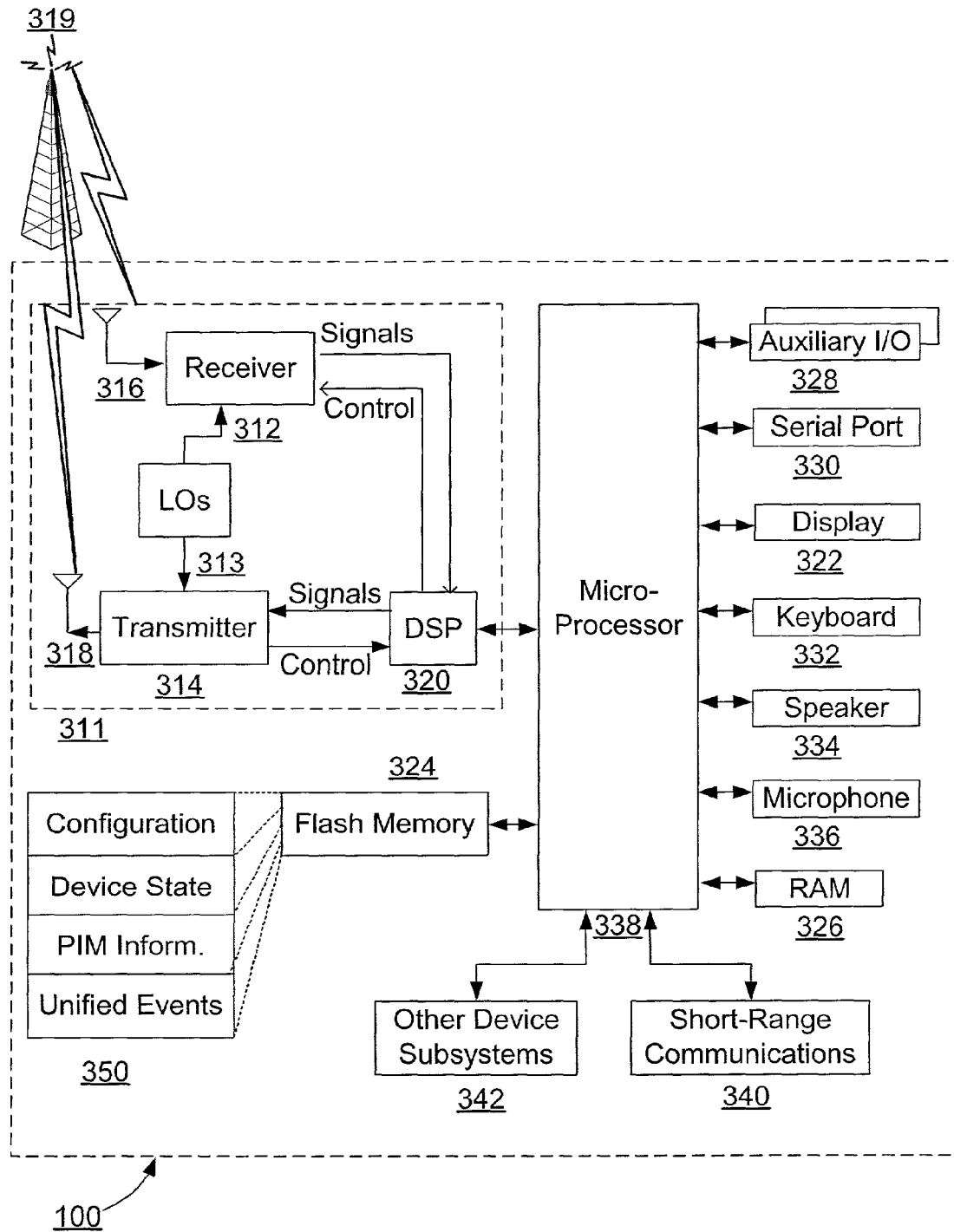
FIG. 5 is an overview of a wireless dual-mode device showing all the major hardware components in the system.

Turning now to FIG. 5 there is a block diagram of a mobile device 100 in which the invention may be implemented. The mobile device 100 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 100 is enabled for two-way communications, the device will incorporate a communication subsystem 311, including a receiver 312, a transmitter 314, and associated components such as one or more, preferably embedded or internal, antenna elements 316 and 318, local oscillators (LOs) 313, and a processing module such as a digital signal processor (DSP) 320. As will be apparent to those skilled in the field of communications, the particular design of the communication subsystem 311 will be dependent upon the communication network in which the device is intended to operate. For example, a mobile device 100 destined for a North American market may include a communication subsystem 311 designed to operate within the Mobitex™ mobile communication system or DataTAC™ mobile communication system, whereas a mobile device 100 intended for use in Europe may incorporate a General Packet Radio Service (GPRS) communication subsystem 311.

Network access requirements will also vary depending upon the type of network 319. For example, in the Mobitex and DataTAC networks, mobile devices such as 100 are registered on the network using a unique personal identification number or PIN associated with each device. In GPRS networks however, network access is associated with a subscriber or user of a device 100. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the mobile device 100 will be unable to carry out any functions involving communications over network 319. When required network registration or activation procedures have been completed, a mobile device 100 may send and receive communication signals over the network 319. Signals received by the antenna 316 through a communication network 319 are input to the receiver 312, which may perform such common receiver functions as signal amplification, frequency down conversion, filtering, channel selection and the like, and in the example system shown in FIG. 5, analog to digital conversion. Analog to digital conversion of a received signal allows more complex communication functions such as demodulation and decoding to be performed in the DSP 320. In a similar manner, signals to be transmitted are processed, including modulation and encoding for example, by the DSP 320 and input to the transmitter 314 for digital to analog conversion, frequency up conversion, filtering, amplification and transmission over the communication network 319 via the antenna 318.

The DSP 320 not only processes communication signals, but also provides for receiver and transmitter control. For example, the gains applied to communication signals in the receiver 312 and transmitter 314 may be adaptively controlled through automatic gain control algorithms implemented in the DSP 320.

The mobile device 100 preferably includes a microprocessor 338 which controls the overall operation of the device. Communication functions, including at least data and voice communications, are performed through the communication subsystem 311. The microprocessor 338 also interacts with further device subsystems such as the display 322, flash memory 324, random access memory (RAM) 326, auxiliary input/output (I/O) subsystems 328, serial port 330, keyboard 332, speaker 334, microphone 336, a short-range communications subsystem 340 and any other device subsystems generally designated as 342.

Some of the subsystems shown in FIG. 5 perform communication-related functions, whereas other subsystems may provide "resident" or on-device functions. Notably, some subsystems, such as keyboard 332 and display 322 for example, may be used for both communication-related functions, such as entering a text message for transmission over a communication network, and device-resident functions such as a calculator or task list.

Operating system software used by the microprocessor 338 is preferably stored in a persistent store such as flash memory 324, which may instead be a read only memory (ROM) or similar storage element (not shown). Those skilled in the art will appreciate that the operating system, specific device applications, or parts thereof, may be temporarily loaded into a volatile store such as RAM 326. It is contemplated that received communication signals may also be stored to RAM 326. As shown the flash memory can be segregated into different areas for both computer programs 358, and program data storage 350, 352, 354 and 356. These different PIM storage types indicate that each program can allocate a portion of flash memory 324 for their own database requirements. Also shown as part of flash memory are sample memory elements 350. This might include but are not limited to configuration information, either entered by the user or part of the manufacturing process, device state information, like the current radio network and region being used, address book information and other PIM information like calendar, tasks and to do lists.

The microprocessor 338, in addition to its operating system functions, preferably enables execution of software applications on the device. A predetermined set of applications that control basic device operations, including at least data and voice communication applications for example, will normally be installed on the mobile device 100 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the mobile device 100 through the network 319, an auxiliary I/O subsystem 328, serial port 330, short-range communications subsystem 340 or any other suitable subsystem 342, and installed by a user in the RAM 326 or preferably a non-volatile store (not shown) for execution by the microprocessor 338. Such flexibility in application installation and/or remote voice-mail system configuration increases the functionality of the device and may provide enhanced on-device functions, communication-related functions, or both. For example, secure communication applications may enable electronic commerce functions and other such financial transactions to be performed using the mobile device 100.

In a data communication mode, a received signal such as a text message or web page download will be processed by the communication subsystem 311 and input to the microprocessor 338, which will preferably further process the received signal for output to the display 322, or alternatively to an auxiliary I/O device 328. A user of mobile device 100 may also compose data items such as email messages for example, using the keyboard 332, which is preferably a complete alphanumeric keyboard or telephone-type keypad, in conjunction with the display 322 and possibly an auxiliary I/O device 328. Such composed items may then be transmitted over a communication network through the communication subsystem 311.

For voice communications, overall operation of the mobile device 100 is substantially similar, except that received signals would preferably be output to a speaker 334 and signals for transmission would be generated by a microphone 336. Alternative voice or audio I/O subsystems such as a voice message recording subsystem may also be implemented on the mobile device 100. Although voice or audio signal output is preferably accomplished primarily through the speaker 334, the display 322 may also be used to provide an indication of the identity of a calling party, the duration of a voice call, or other voice call related information for example.

The serial port 330 in FIG. 5 would normally be implemented in a personal digital assistant (PDA)-type communication device for which synchronization with a user's desktop computer (not shown) may be desirable, but is an optional device component. Such a port 330 would enable a user to set preferences through an external device or software application and would extend the capabilities of the device by providing for information or software downloads to the mobile device 100 other than through a wireless communication network. The alternate download path may for example be used to load an encryption key onto the device through a direct and thus reliable and trusted connection to thereby enable secure device communication.

A short-range communications subsystem 340 is a further optional component which may provide for communication between the mobile device 100 and different systems or devices, which need not necessarily be similar devices. For example, the subsystem 340 may include an infrared device and associated circuits and components or a Bluetooth™ communication module to provide for communication with similarly-enabled systems and devices.

D. Remote Control Over PBX System

Another aspect of the invention is a direct remote control over the office PBX system 120. The illustration shown in FIG. 6 closely follows the description provided in FIG. 3. In this illustration, the user of the mobile device 100 wants to set up a conference call. To perform this action, the user sends one or more commands through his mobile device to the unified messaging server 115 to request the resources of the associated PBX system 120. The example of a conference call is just one type of PBX service that could be requested using this method. Other methods that could also be used include, but are not limited to: a point-to-point call with one other person, calling a company extension, forwarding a voice-mail call to another number and other advanced call processing. Another embodiment, could also allow the user to submit data messages that would be converted from text to speech. This could include text messages to change the daily greeting, text messages to record extended absence prompts and other similar voice-mail related voice prompts.

Figure 6:
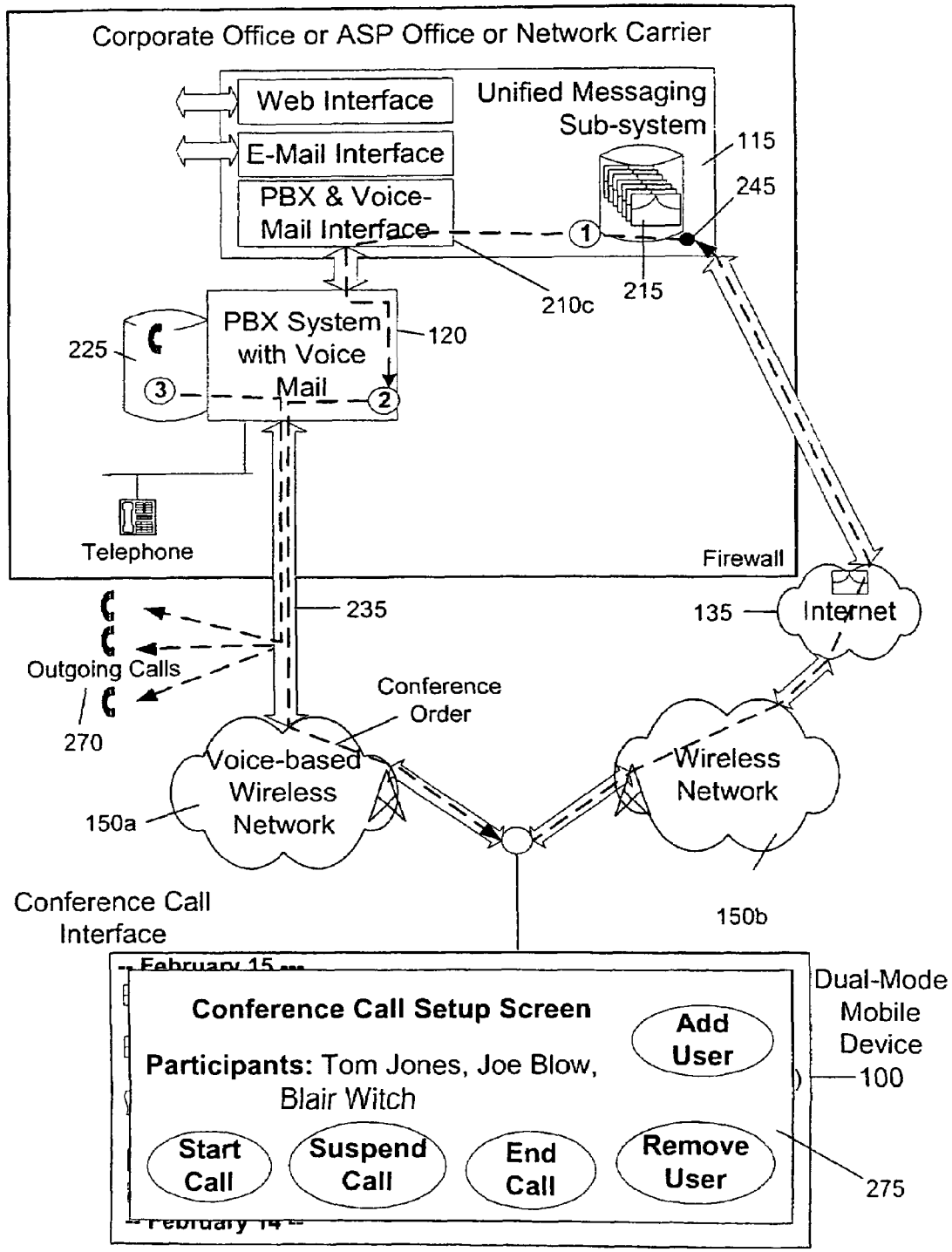
FIG. 6 is an illustration of how conference call is established using the mobile device as the conference call initiator.

Turning now to FIG. 6 in this third embodiment of the invention, the user of the mobile device 100 sends a command to the unified messaging system 115 to request resources from the PBX system 120. The unified messaging server 15 then performs an action on behalf of the user based on the command that requests voice circuits from the PBX server 120 which in turn eventually engages the voice component of the mobile device 100. In step (1) of FIG. 6 the user of the mobile device 100 invokes a conference initiate screen 275. This is just one example screen—there are many ways to present this information to a user of a small handheld mobile device. In this example, the user selects the conference participants or conferencees, most likely via an address book or contact database on the mobile device 100. Conferencees may be added or subtracted as needed until the user/conferencor is satisfied that the correct number of conferencees is present. This activity could also be preformed from the calendar program on the device. In this embodiment, the calendar entry contains all the participants of a meeting, each is presented to the user when the time expires for the meeting. The user then confirms the participants and the meeting starts. Once the conference participants of the conference are selected the Start Call button is selected. This results in taking step (1) of this embodiment, where the mobile device 100 sends a conference request command to the unified messaging service 115. The unified messaging service 115 recognized the command 245, and does not treat the message like data. As already mentioned, this command could come in an e-mail and have a special subject, or body command string that is being monitored to identify the e-mail as containing commands for a conference call. The command is then passed over to the PBX/voice-mail interface 210*c*, which interfaces to the PBX system 120 to perform the requested actions. The command preferably includes the command type, the necessary phone numbers and any other necessary information to correctly execute the command submitted.

Step (2) now takes places as the PBX and voice-mail interface 210*c* uses the applicable API to request resources from the PBX component 120. For our example this command is a request to set up a multiple-person conference call using the telephone numbers provided by the user in the original command. Preferably, the PBX system 120 sets up a voice call to the mobile device 100 since the mobile device is the requester of the conference call and must be present. In step (3) the PBX system 120 then makes all necessary phone calls using phone circuits to call the other parties 270 specified by the user. In our example there are three calls shown, this could be reduced or increased depending on the system. As user's pick up the call they could be played a canned message, like 'You are joining an electronically established conference call'. The organizer of the conference call might hear a beep or a signal each time a new caller is connected. Alternatively, as each new conference is successfully contacted by the PBX (a new voice call connection is established), the voice call connection may be promptly connected to the mobile device to establish the conference call. Step (3) completes when at least one call is established and the call proceeds. During the call the user that initiated the conference may 'suspend the call' or 'end the call'. These actions would also be sent using commands back through the wireless network data channel to the unified messaging server 115. Alternatively, the mobile device, through user input, could play DTMF tones to the PBX system 120 to change the state of the conference call.

There are many advantages to establishing a conference call using this method including, but not limited to: cost savings to the user of the mobile device 100, there is improved reliability in establishing the call, and there is a time savings as conference calls can take a lot of effort to get established on a mobile phone. The increased reliability to the mobile user is realized if the mobile user happens to roam during the call itself. If the mobile phone goes into dead areas, or the call is dropped by the base stations, the circuit will be lost during the conference. If this were to happen the PBX system 120 would be programmed to re-call the user and establish the call again. In this way the PBX system 120 act as a proxy owner of the conference, not the mobile user, thus increasing the reliability and ensuring the conference continues despite bad wireless network coverage situations.

Figure 7:
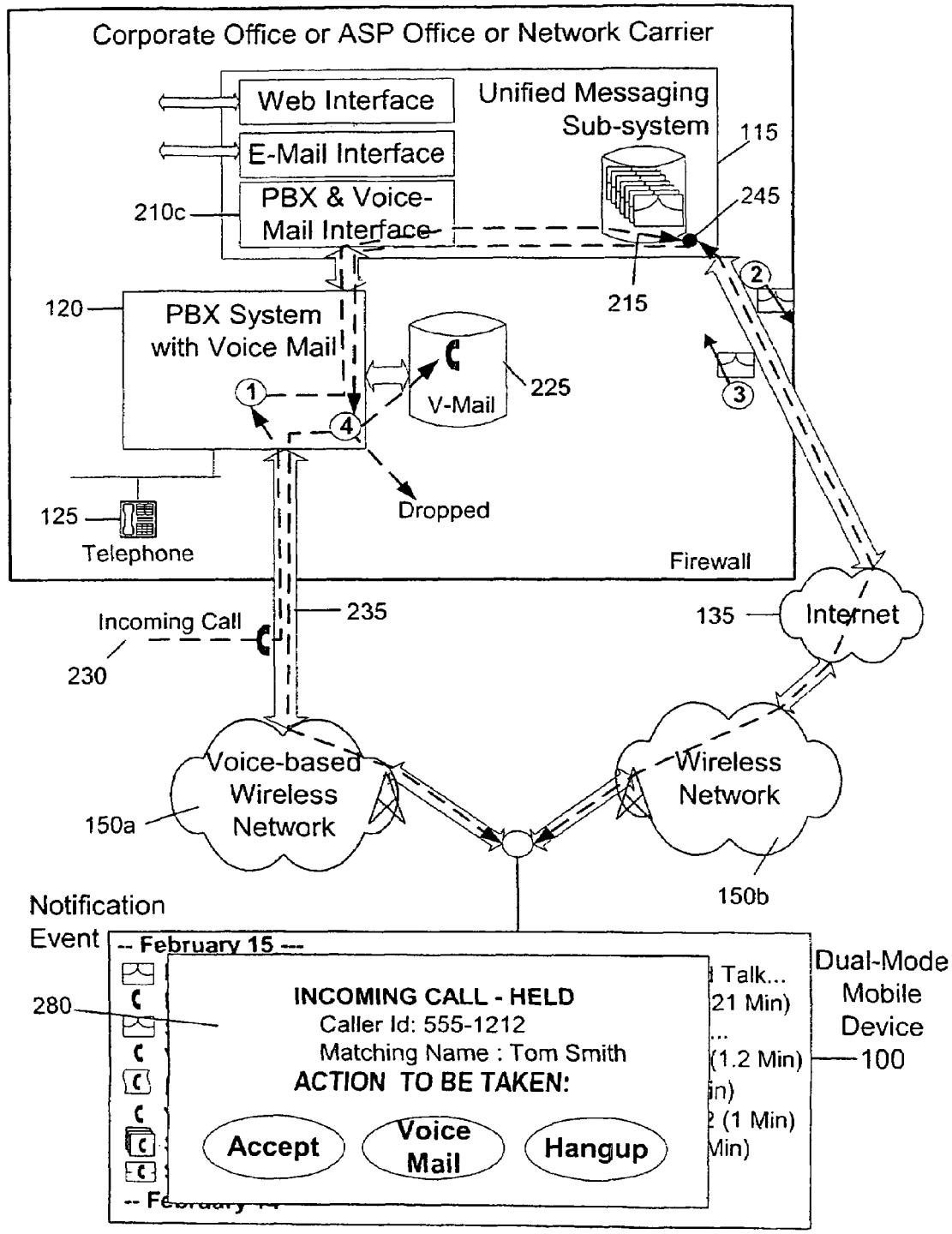
FIG. 7 is an illustration of how an incoming call can be held and controlled by the user of a mobile device.

Turning now to FIG. 7 there is yet another embodiment of how a dual-mode mobile device 100 can use their data channel to remote control voice events to their handheld device. In this example the mobile device user 100 receives a call into their land-line phone number. This could be a number provided by an ASP/IPS, network carrier or within their corporate office. Unlike FIGS. 2 and 3, the user has configured the PBX system 120 to hold the call and send a notification that the call has arrived (step (1). Step (1) summaries the incoming call with information that includes, but is not limited to: the caller Id, time of the call and any matching name information from preferably a locally stored address book. The summary message is given to the PBX and Voice-mail interface quickly and get delivered to the mobile device 100 quickly. Step (2) is the delivery of the message indicating a call has arrived and is on hold. During this time the calling party might be played a message like 'Please Hold while we contact the 'Joe Blow' for you'. If for some reason the command is delayed, or the mobile device 100 is out of coverage, the incoming call is timed out and placed into voice-mail 225. However in most cases the command does reach the user of the mobile device 100 and they act upon the message.

The incoming notification event might cause a dialog box to appear 280, similar to that shown in FIG. 7. This dialog box simply shows the caller Id, matching name and any other summary information that can be extracted from the caller. The user can then direct the PBX system 120 what to do with the call. In this case all commands will cause a response to go back to the unified messaging server 115. In step (3) the command reaches the unified messaging server 115 and it detects the command and gives it to the PBX and Voice-mail interface 210c. The command response will have a reference identifier for the held call so that the PBX and voice-mail interface 210c can direct the PBX system 120 what to do with the caller. In step (4) the PBX system acts upon the command and either sends the call to voice-mail 225, drops the caller, i.e. hangs up immediately, or redirects the call to the mobile device 100. The user can even provide an override to the default phone number in the command response if necessary to tell the PBX system 120 where to send the caller.

Figure 8:
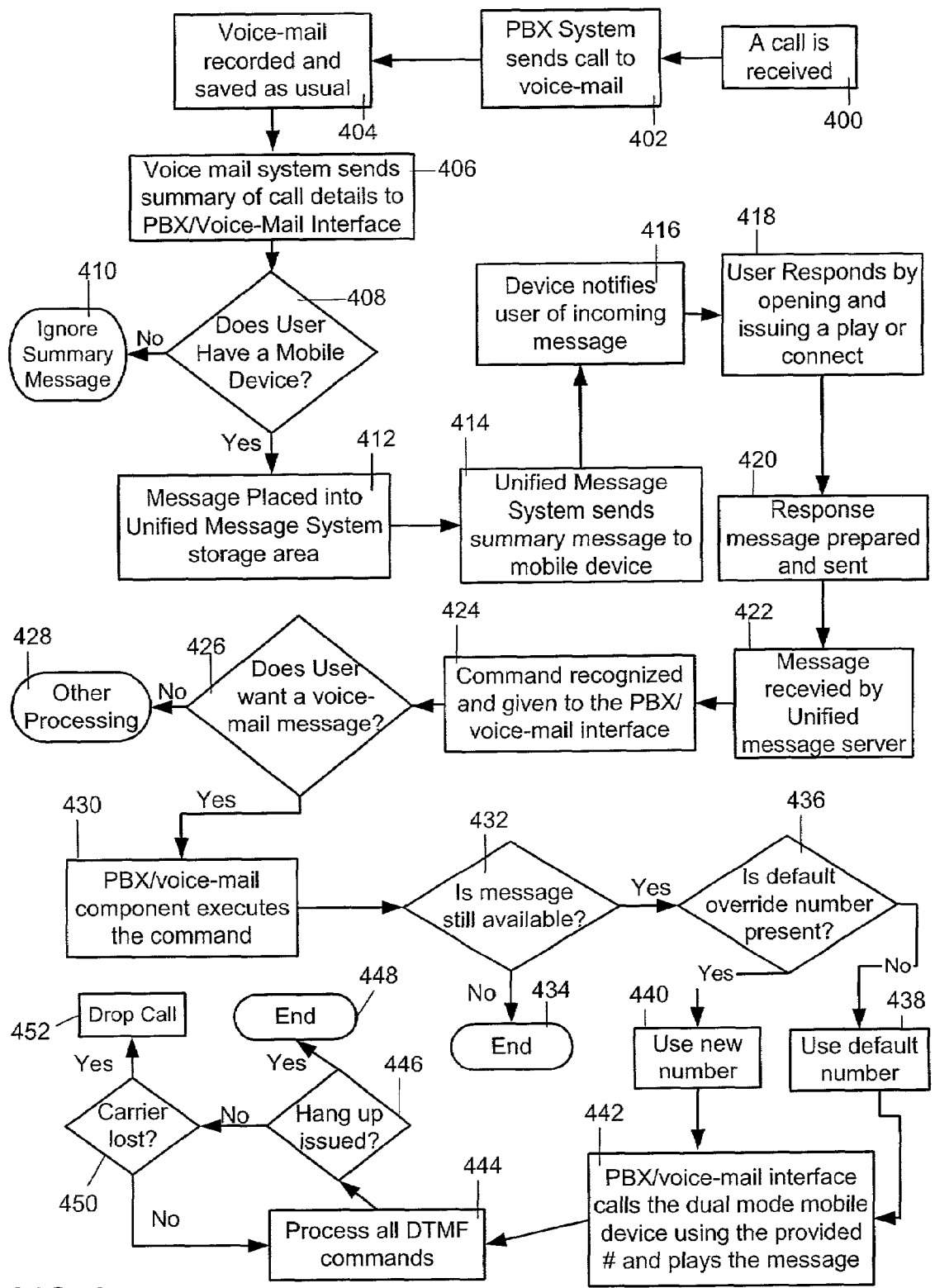
FIG. 8 is a data flow diagram showing the steps necessary to request a voice-mail message by sending a data message to a unified messaging server.

Turning now to FIG. 8 there is a data flow diagram for the steps necessary to perform one embodiment of the invention. In this illustration the user of the mobile device 100 is requesting to play a voice-mail message. This data flow follows the steps shown in FIG. 3; although comments about FIG. 2 will also be mentioned. The data flow starts when a call is received for the user 400. The call is handled by the PBX system 120 and directed to the user's phone, which could be a phone number hosted by a network carrier, an ISP or an ASP 402. Since the user is not present the PBX system directs the call to voice-mail where a message is recorded and stored 404. Since the PBX/voice-mail interface is monitoring all activity through the available API, it is informed or detects the new voice message arrival. It then builds a summary of the call via the API, and determines the Id of the user receiving the voice-mail message 406. The PBX/voice-mail interface then determines if the user that received the voice-mail message has a mobile device 100 capable of supporting this advanced functionality 408. If the user does not have a mobile device 100, then the summary message is not sent to the wireless network 150b and the voice-mail message is ignored 410 (the user may access the voice-mail message as he or she traditionally would from his or her desktop telephone at, for example, the office). Otherwise the summary message is placed in the unified messaging system storage area to be scheduled for delivery to the mobile device 412. The unified messaging system then sends a summary of the message to the mobile device user 414. The mobile device user 100 is then notified following the setting on the mobile device 416. The user responds immediately, or at a later date, to the voice-mail summary message that is shown in the unified event screen. The user opens the message and selects a Play or Connect while viewing the details of the message 418. In the embodiment described in FIG. 2 and FIG. 3, this is where the two methods vary. In FIG. 2 the next step is to call the PBX system and proceed from step 430. In the embodiment described by FIG. 3 the mobile device 100 prepares a response message containing the voice-mail message reference number, an overriding callback phone number, any authentication information for security, and any other pertinent information 420. The message is then sent and received by the unified messaging server 422. The command is recognized and the type matches a voice-mail command, so it is given to the PBX/voice-mail interface 424. The PBX/voice-mail interface determines that the user wants to play-back a previously recorded message, and provides the necessary information to locate and execute this command 426. If the command is not a voice-mail playback command then the invention proceeds to process one of the many other types of commands that have been discussed 428. Otherwise the PBX/voice-mail interface proceeds to start executing the command 430. The first step is to determine if the voice-mail message is still available in storage 432. If the message cannot be found the processing ends for this command 434. Otherwise the PBX/voice-mail interface determines if there is an override number present 436. If there is no override number then the configured default number for the mobile device user is used 438. If an override number is present then the override callback number is used 440. The PBX/voice-mail interface then calls the mobile device 100, using PBX phone circuit resources 442. The mobile device 100 recognizes the incoming call from the PBX system and accepts it automatically. In one embodiment, the user is preferably not notified of the incoming call from the PBX and the accepting step is accomplished without user involvement. A voice call is then established between the mobile device and the PBX for access of voice mail system functionality. At this point, the user is able to interact with the PBX and voice mail system 120 through a voice mail graphical user interface 260, 265 on the mobile device. Upon selection of one or more of the voice mail GUI menu items, the mobile device can issue control signals, for receipt by the voice mail system, to initiate the action associated with the selected menu item. In one preferred embodiment, the control signals are DTMF tones or a sequence thereof associated with the requested action. Preferably, said issuance is accomplished with the speaker of the mobile device muted or suppressed so that the user is not necessarily hearing said DTMF tones to thereby provide a more user friendly, seamless and transparent user interface to the voice mail system. It should be understood that an audible notification of the selected voice mail action has started or ended is still possible while still suppressing said DTMF tones. The user might simply listen to the requested message, they might delete the message, forward the message or simply hangup. The user might also go to the previous message, the next message or scan their entire voice-mailbox for a certain message. A test scan is performed to watch for a hangup command 446, and if one is entered by the user the call is ended 448. The system also watches for the loss of the carrier, indicating the user simply hung-up on the call without using the menu options 450. If the carrier is lost spontaneously the call is ended 452. Otherwise the system loops around and continues to watch DTMF tones for processing 444. At some point the user completes the call and either issues a hangup command, or drops the carrier on the phone circuit.

Figure 9:
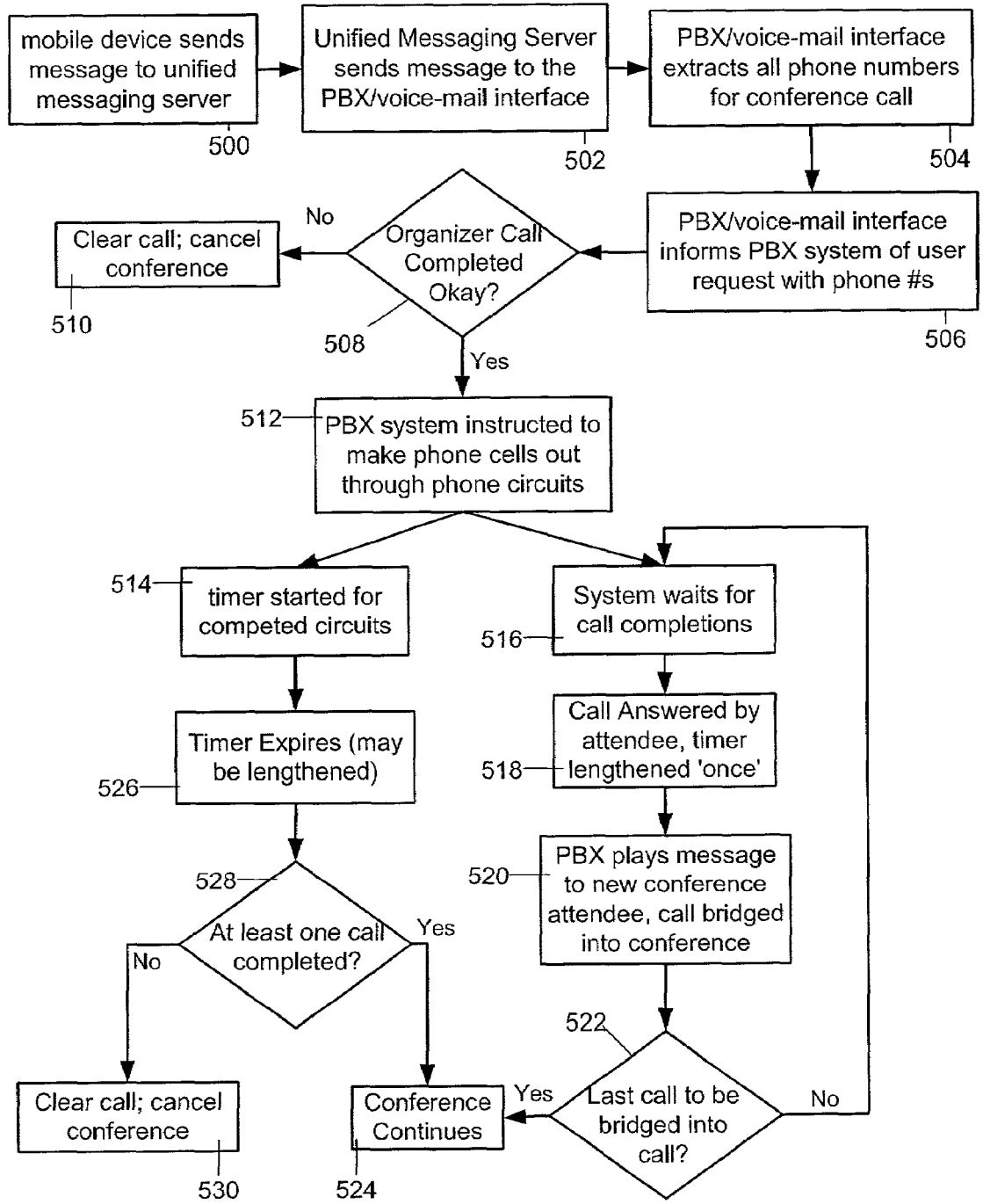
FIG. 9 is a data flow diagram showing the steps necessary to set up a conference call via a data message sent to a unified messaging server; and, FIG. 10 is a data flow diagram showing the steps necessary to process a held call via a data message sent to a unified messaging server.

Turning now to FIG. 9 this is a data flow diagram that illustrates the steps in FIG. 6. In this embodiment the mobile device 100 is requesting a conference call via a data command sent to the unified messaging system 115. The first step in this data flow diagram when the user decides to construct a conference call command 500. The command contains the conference request, the names and optionally the phone numbers of the other attendees in the conference and any security information that might be needed. This message is sent to the unified messaging server 115 and it identifies the message as a PBX/voice-mail command and gives it to the PBX/voice-mail interface component 502. The PBX/voice-mail interface extracts the phone numbers, mobile device 100 identifier and other information from the command 504. The PBX/voice-mail interface interacts with the PBX and passes the numbers for the conference call 506. The PBX/voice-mail interface monitors the calls and first determines whether the call to the conference organizer was successful 508. If this call fails then there is no point in having a conference, so the call is dropped and the command aborted 510. If the organizer is in coverage and the call is answered the PBX system 120 is instructed to continue with the conference and make the remaining phone calls to the conference attendees 512. During this step a timer is started to ensure that the command does not wait forever for calls that cannot be completed 514. The system also waits and watches for completed phone circuits for the conference attendees 516. If an attendee does answer the call the conference call timer is lengthened 518, but this is only done once. Since the call has started successfully, with at least one attendee the other call attempts can be allowed to wait longer 518. Each time an attendee is connected an optional short message is played telling them they are starting a conference call—the organizer's name may also be part of this recorded message 520. The new call is then bridged into the organizer's circuit and the call can be considered started 520. A test is performed to see if this call was the last attendee expected 522 and if so the conference is continues and no further waiting is performed for new circuits. Otherwise the software returns to wait for additional circuits to be closed—i.e. calls to be answered 516. If the call conference timer expires 526, it may be a short or longer timer that has expired 526. A check is performed to see if any of the calls that were attempted were successful 528. If no call was successful in the allotted time, all circuits are closed, all pending calls terminated and the organizer's circuit is also closed 530. Otherwise, all pending circuits are closed and the conference continues with those parties that have answered their phones 524.

Figure 10:
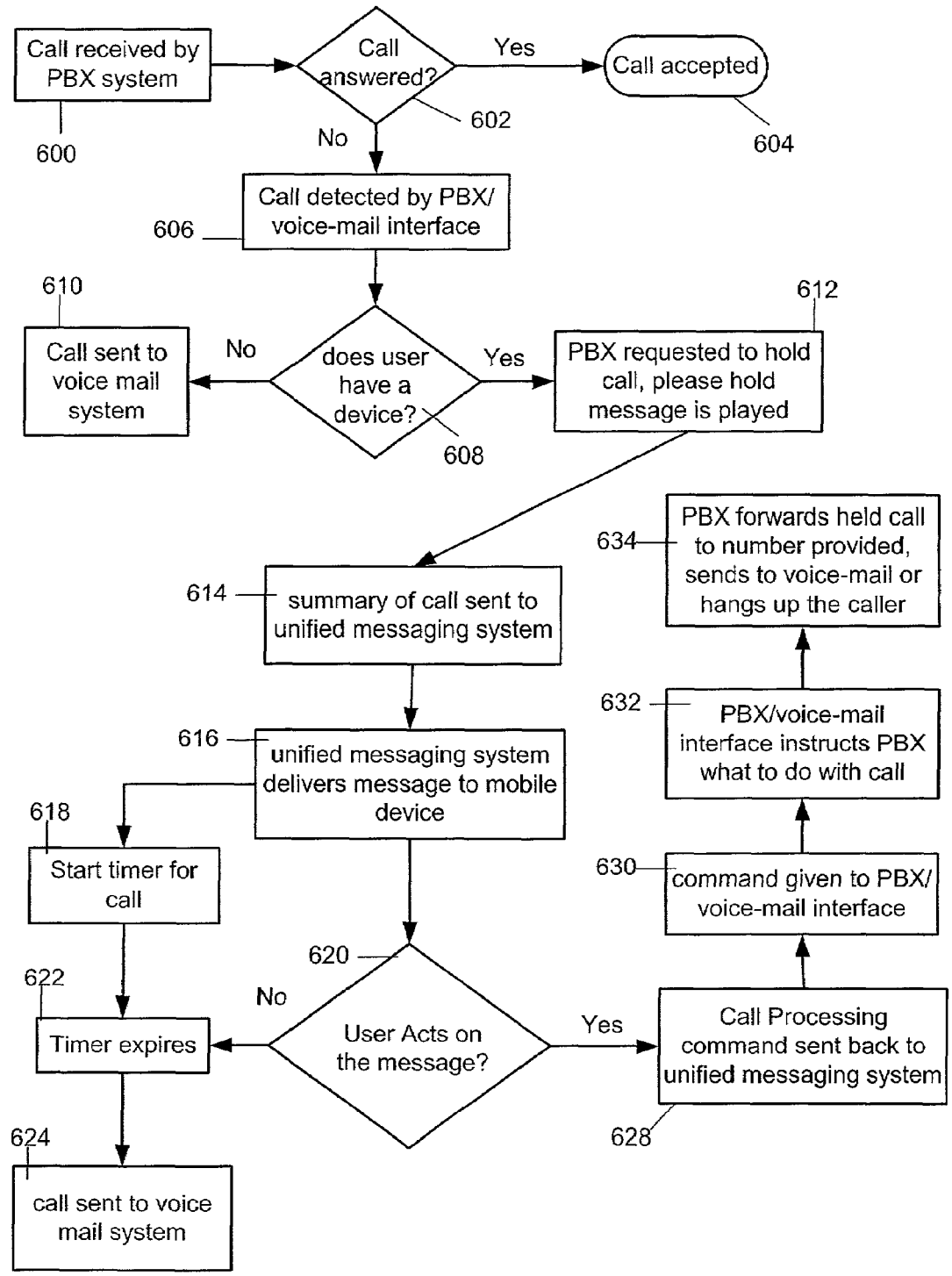

Turning now to FIG. 10 this data flow illustrates the embodiment of the invention highlighted in FIG. 7. In this example an incoming call arrives and the mobile device 100 is told of the incoming call and given a choice of various actions. This data flow starts with the arrival of the call into the PBX system 120 associated to the user 600. This could be within the network carrier, in an ASP/ISP environment, or within the corporate office. If the call is answered by the user 602, then there is nothing to do and the call is accepted 604. Otherwise the call is detected by the PBX/voice-mail interface, via the API provided by the PBX system 606. The PBX/voice-mail interface determines whether the user receiving the call has a mobile device 608. If the user does not have a mobile device 100 the call is allowed to go into voice mail 610. Otherwise the PBX is requested by the PBX/voice-mail interface 210c to hold the call and play a 'please hold while we contact the user' message 612. A summary of the call is sent to the mobile device 100 that includes the caller id, time of call and any other information that might exist 614. The call-holding summary message is placed in the unified messaging system storage area 215, so that it can be delivered by the unified messaging system to the mobile device 616. After the message is sent the PBX/voice-mail interface runs a timer to ensure the call on hold does not wait too long 618. If the mobile device 100 is out of coverage it is possible the message will take too long to reach the user. Once the message is received the user has to decide quickly to act upon the message. If they ignore the message or decide to do nothing then a default action will be taken 620. In most cases the default action will be to send the caller into voice-mail; but for one skilled in the art any number of configured choices are possible. If they ignore the message, or if they take too long and the timer expires, the call will be sent into voice-mail 624. If the user does act upon the message they can make a selection from various choices like hangup, send to voice-mail and forward to the mobile device 100. These are just a few choices, but there could also be a forwarded to another phone number that does not belong to the user being called or another canned message could be played. When the command is selected by the user it is packaged into a format understood by the unified messaging server 115 and sent back over the wireless network to the unified messaging server 628. The unified message server 115 detects that this is a PBX and voice-mail command and passes the message to the PBX/voice-mail interface 630. The PBX/voice-mail interface then instructs the PBX/voice-mail sub-system 120 what to do with the held call 632. In this situation the PBX system 120 either hangs up the call, sends it to voice mail, or forwards on to the user's mobile device 634.

These are four examples of many preferred embodiments of a method and system for remotely controlling a host system from a dual-mode communications device. This invention also makes direct use of the patented invention for pushing information to a mobile data communications device. These two inventions augment each other to produce a dual-mode resulting action on a single device. Another interesting advanced implementation might allow a user of a dual-mode phone to co-ordinate a three-way video-phone call from the mobile device.

It will be appreciated that the above description relates to a preferred embodiment by way of example only. Many variations on the invention will be within the scope of those knowledgeable in the field, and such variations are within the scope of the invention as described and claimed, whether or not expressly described.

We claim:

1. A method of processing a voice mail message in a unified messaging system using a wireless mobile communication device having circuitry for communicating over a wireless data communication channel and a wireless voice communication channel, the method comprising:
   receiving the voice mail message at the unified messaging system and storing it in a data store associated with a user of the wireless mobile communication device;
   detecting the stored voice mail message at the data store and transmitting a notification signal to the wireless mobile communication device via the wireless data communication channel, the notification signal including information regarding the voice mail message;
   displaying the voice mail message information on a display interface of the wireless mobile communication device, the display interface providing one or more commands for processing the voice mail message, wherein one of the one or more commands includes a message retrieval command;
   transmitting a command signal from the mobile communication device to the unified messaging system via the wireless data communication channel, the command signal including the message retrieval command;
   providing the message retrieval command to a voice mail system component of the unified messaging system;
   the voice mail system component initiating a voice call to the wireless mobile communication device in response to the message retrieval command via the voice communication channel; and
   transmitting the voice mail message to the wireless mobile communication device via the voice communication channel.

2. The method of claim 1, further comprising playing the voice mail message on the mobile communication device.

3. The method of claim 1, wherein the step of transmitting the notification signal to the mobile communication device further comprises:
   preparing an email message including the information regarding the voice mail message; and
   transmitting the email message to the mobile communication device.

4. The method of claim 1, wherein the information regarding the voice mail message comprises at least one of a message waiting indicator, a voice mail message reference identification, a voice mail access telephone number, a caller identification, or a date and time of the voice mail message.

5. The method of claim 1, wherein the notification signal is one of an e-mail message, an SMS message, an Internet Message Service message, an Enhanced Messaging Service message, or a Multi-Media Messaging Service message.

6. A method of remotely controlling a voice mail system using a wireless device capable of communicating via a wireless data network and a wireless voice network, the method comprising:
   receiving a voice call at the voice mail system and storing a voice mail message in a voice mail box associated with a user of the wireless device:
   detecting the stored voice mail message in the voice mail box;
   transmitting a notification message to the wireless device via the wireless data network, the notification message indicating that the voice mail message is stored in the user's voice mail box;
   transmitting a connection request command message from the wireless device to the voice mail system via the wireless data network;
   in response to the connection request command, the voice mail system initiating a voice call to the wireless device via the wireless voice network; and
   receiving the stored voice mail message at the wireless device via the wireless voice network.

7. The method of claim 6, further comprising:
   interfacing a private branch exchange (PBX) system to the voice mail system;
   receiving the voice call at the PBX system and routing the voice call to the voice mail system.

8. The method of claim 7, wherein the voice mail system is integrated into the PBX system.

9. The method of claim 6, further comprising:
   associating a reference identification with the stored voice mail message;
   including the reference identification in the notification message transmitted to the wireless device; and
   including the reference identification in the command signal transmitted to the voice mail system so that the voice mail system can process the stored voice mail message.

10. The method of claim 6, wherein the voice mail system is coupled to a unified messaging system, the method further comprising:
    interfacing the unified messaging system with the voice mail system; and
    generating the notification message at the unified messaging system.

11. The method of claim 10, further comprising:
    transmitting e-mail messages from the unified messaging system to the wireless device via the wireless data network.

12. The method of claim 11, wherein the e-mail messages are stored at an e-mail server that interfaces with the unified messaging system.

13. The method of claim 6, wherein the notification message is one of an e-mail message or an SMS message.

14. The method of claim 6, wherein the notification message includes information describing the voice mail message stored in the voice mail box.

15. The method of claim 14, wherein the notification message information includes at least one of a voice mail reference identifier, a voice mail system telephone access number, caller identification information, or a date and time of the voice call.

16. The method of claim 6, further comprising:
displaying a unified event listing at the mobile device, the unified event listing including at least e-mail message events and voice mail message events received at the wireless device.

17. The method of claim 16, further comprising:
associating a first graphical icon with the e-mail message events and a second graphical icon with the voice mail message events at the wireless device; and
displaying the first and second graphical icons on the unified event listing.

18. The method of claim 17, further comprising:
the user selecting one of the graphical icons associated with a voice mail message; and
displaying voice mail message information regarding the selected voice mail.

19. The method of claim 18, wherein the voice mail message information includes at least one of a voice mail reference identifier, a voice mail system telephone access number, caller identification information, or a date and time of the voice call.

20. The method of claim 6, further comprising:
displaying a command list at the wireless device, the command list including one or more commands associated with voice mail operations; and
selecting and transmitting one of the commands on the command list from the wireless device to the voice mail system to remotely control the operation of the voice mail system.

21. The method of claim 20, further comprising:
for each of the commands on the command list, configuring the wireless device to output a voice mail system operating command; and
after a command is selected, transmitting the voice mail system operating command from the wireless device to the voice mail system.

22. The method of claim 21, wherein the voice mail system operating command comprises a sequence of one or more DTMF signals.

23. The method of claim 6, further comprising
the wireless device recognizing an incoming call from the voice mail system; and
automatically answering the incoming call without engaging a ringing mechanism on the wireless device.

24. A system for remotely controlling a voice mail system using a wireless device capable of communicating via a wireless data network and a wireless voice network, comprising:
means for receiving a voice call at the voice mail system and storing a voice mail message in a voice mail box associated with a user of the wireless device;
means for detecting the stored voice mail message in the voice mail box;
means for transmitting a notification message to the wireless device via the wireless data network, the notification message indicating that the voice mail message is stored in the user's voice mail box:
means for transmitting a connection request command message from the wireless device to the voice mail system via the wireless data network;
means, responsive to the connection request command for initiating a voice call to the wireless device via the wireless voice network; and means for receiving the stored voice mail message at the wireless device via the wireless voice network.

25. The system of claim 24, further comprising:
means for interfacing a private branch exchange (PBX) system to the voice mail system; and
means for receiving the voice call at the PBX system and for routing the voice call to the voice mail system.

26. The system of claim 25, wherein the voice mail system is integrated into the PBX system.

27. The system of claim 24, further comprising:
means for associating a reference identification with the stored voice mail message;
means for including the reference identification in the notification message transmitted to the wireless device; and
means for including the reference identification in the command signal transmitted to the voice mail system so that the voice mail system can process the stored voice mail message.

28. The system of claim 24, wherein the voice mail system is coupled to a unified messaging system, the system further comprising:
means for interfacing the unified messaging system with the voice mail system; and
means for generating the notification message at the unified messaging system.

29. The system of claim 28, further comprising:
means for transmitting e-mail messages from the unified messaging system to the wireless device via the wireless data network.

30. The system of claim 29, wherein the e-mail messages are stored at an e-mail server that interfaces with the unified messaging system.

31. The system of claim 24, wherein the notification message is one of an e-mail message or an SMS message.

32. The system of claim 24, wherein the notification message includes information describing the voice mail message stored in the voice mail box.

33. The system of claim 32, wherein the notification message information includes at least one of a voice mail reference identifier, a voice mail system telephone access number, caller identification information, or a date and time of the voice call.

34. The system of claim 24, further comprising:
means for displaying a unified event listing at the mobile device, the unified event listing including at least e-mail message events and voice mail message events received at the wireless device.

35. The system of claim 34, further comprising:
means for associating a first graphical icon with the e-mail message events and a second graphical icon with the voice mail message events at the wireless device; and
means for displaying the first and second graphical icons on the unified event listing.

36. The system of claim 35, further comprising:
means for selecting one of the graphical icons associated with a voice mail message; and
means for displaying voice mail message information regarding the selected voice mail.

37. The system of claim 36, wherein the voice mail message information includes at least one of a voice mail reference identifier, a voice mail system telephone access number, caller identification information, or a date and time of the voice call.

38. The system of claim 24, further comprising:
means for displaying a command list at the wireless device, the command list including one or more commands associated with voice mail operations; and
means for selecting and transmitting one of the commands on the command list from the wireless device to the voice mail system to remotely control the operation of the voice mail system.

39. The system of claim 38, further comprising:
means, applicable to each of the commands on the command list, for configuring the wireless device to output a voice mail system operating command; and
means for transmitting the voice mail system operating command from the wireless device to the voice mail system.

40. The system of claim 39, wherein the voice mail system operating command comprises a sequence of one or more DTMF signals.

41. The system of claim 24, further comprising
means for recognizing an incoming call from the voice mail system; and
means for automatically answering the incoming call without engaging a ringing mechanism on the wireless device.

42. A wireless device capable of communicating via a wireless data network and a wireless voice network, the wireless device for use in conjunction with a voice mail system that receives a voice call and stores a voice mail message in a voice mail box associated with a user of the wireless device, comprising:
means for receiving a notification message via the wireless data network, the notification message indicating that the voice mail message is stored in the user's voice mail box; and
means for transmitting a connection request command message from the wireless device to the voice mail system via the wireless data network;
wherein the connection request command causes the voice mail system to initiate a voice call to the wireless device via the wireless voice network, the wireless device including means for automatically answering the voice call and receiving the stored voice mail message via the wireless voice network.

* * * * *